(12) United States Patent
Mendiola et al.

(10) Patent No.: US 7,319,882 B2
(45) Date of Patent: Jan. 15, 2008

(54) MESSAGING SYSTEM INVOLVING WIRELESS COMMUNICATIONS AND METHODS THEREFOR

(75) Inventors: Dennis Mendiola, New York, NY (US); Samuel S. Montecastro, Quezon (PH); Joseph Michael C. Garrovillo, Muntinlupa (PH)

(73) Assignee: Chikka Pte Ltd, Singapore (SG)

( * ) Notice: Subject to any disclaimer, the term of this patent is extended or adjusted under 35 U.S.C. 154(b) by 240 days.

(21) Appl. No.: 10/433,972

(22) PCT Filed: Dec. 7, 2001

(86) PCT No.: PCT/SG01/00255

§ 371 (c)(1),
(2), (4) Date: Jun. 6, 2003

(87) PCT Pub. No.: WO02/47320

PCT Pub. Date: Jun. 13, 2002

(65) Prior Publication Data

US 2004/0058694 A1    Mar. 25, 2004

(30) Foreign Application Priority Data

Dec. 8, 2000  (SG)  ............................. 200007381-7
Jul. 25, 2001  (SG)  ............................. 200104506-1

(51) Int. Cl.
*H04Q 7/20* (2006.01)

(52) U.S. Cl. ............... 455/466; 455/414.1; 455/414.2; 455/414.3; 455/414.4; 455/551; 455/518; 715/753; 715/758; 709/206; 709/201; 709/202; 709/203; 709/217; 709/218; 709/227

(58) Field of Classification Search ............. 455/412.1, 455/412.2, 414.1, 414.2, 414.3, 414.4, 466, 455/410, 551, 518; 709/203, 204, 205, 206, 709/217, 218, 228, 229; 715/753, 758; 707/1
See application file for complete search history.

(56) References Cited

U.S. PATENT DOCUMENTS 6,122,523 A * 9/2000 Zicker et al. ............... 455/551

(Continued)

*Primary Examiner*—Rafael Perez-Gutierrez
*Assistant Examiner*—Olumide Ajibade-Akonai
(74) *Attorney, Agent, or Firm*—Intellectual Property Law Group LLP; Otto O. Lee; Juneko Jackson

(57) ABSTRACT

A messaging system (11) for conveying messages between a host server (15) and a client (13a) that is part of a GSM network and a method therefor. The GSM network includes an SMS facility to convey messages between its clients using an SMSC (25), each wireless client having a network identifying number (NIN) associated with it to uniquely identify the client within the GSM network. Each message comprises a message packet (43) including the address (49) of an intended recipient, the address (47) of the sender of the message and the message itself (51). The host server (15) may be selectively connected to a plurality of different client types (13) via the Internet (19) to convey messages therebetween. Each client has a client identifying number (CIN) associated with it to uniquely identify it to the host server (15). The host server (15) and the SMSC (25) are interconnected by the Internet (19) or another computer network to provide for communications therebetween. One of the clients (13) of the host server (15) is a wireless client (13a) and has its CIN corresponding to its NIN. The host server (15) has an access code (AC) to uniquely identify it to the SMSC (25) and a unique identification number (UIN) ascribed to: (i) a prescribed action performed by it, and (ii) an entity that is the subject of the prescribed action. The messages sent in message packet (43) between the host server (15) and the wireless client (13a) in connection with a particular prescribed action and entity include: (i) a combination of the AC and the UIN ascribed to the particular action and entity as the address of the host server (15); and (ii) the NIN as the address of the wireless client. The SMSC (25) also uses the AC in the address of the intended recipient or the sender to recognize messages sent to or received from the host server (15) and routs the messages accordingly.

27 Claims, 11 Drawing Sheets

U.S. PATENT DOCUMENTS

| | | | |
|---|---|---|---|
| 6,366,962 B1 * | 4/2002 | Teibel ........................ | 709/245 |
| 6,714,793 B1 * | 3/2004 | Carey et al. ................. | 455/466 |
| 6,856,809 B2 * | 2/2005 | Fostick ....................... | 455/466 |
| 6,895,425 B1 * | 5/2005 | Kadyk et al. ................ | 709/203 |
| 7,190,956 B2 * | 3/2007 | Dorenbosch et al. .... | 455/435.1 |
| 2001/0003202 A1 * | 6/2001 | Mache et al. ............... | 713/153 |
| 2001/0003203 A1 * | 6/2001 | Mache ........................ | 713/201 |
| 2001/0042095 A1 * | 11/2001 | Kim et al. ................... | 709/204 |
| 2002/0165000 A1 * | 11/2002 | Fok ............................. | 455/466 |
| 2002/0173299 A1 * | 11/2002 | Buchholz et al. ........... | 455/418 |
| 2002/0183080 A1 * | 12/2002 | Poor et al. ................... | 455/466 |

* cited by examiner

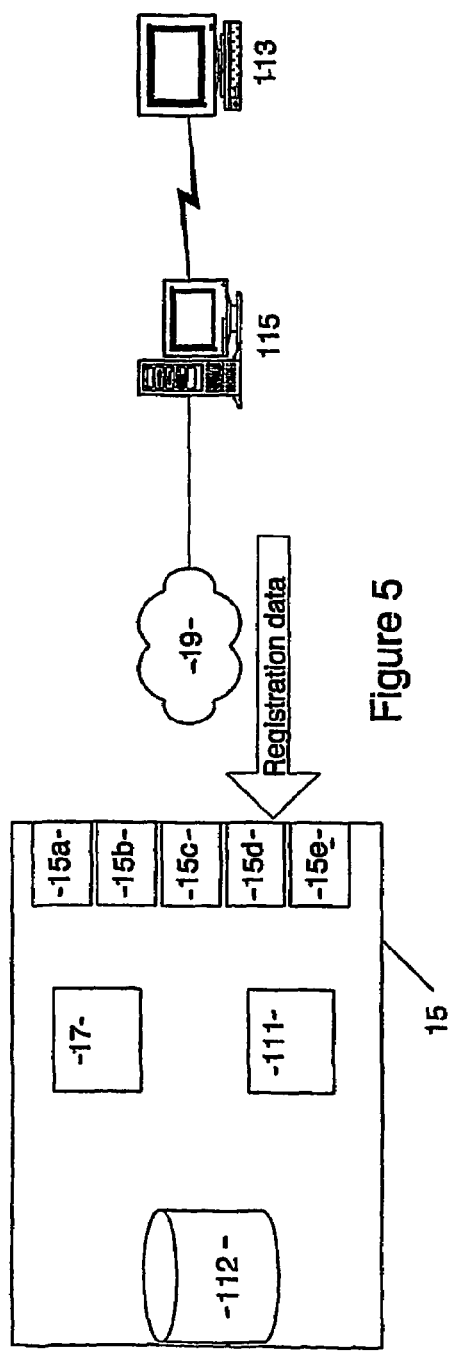
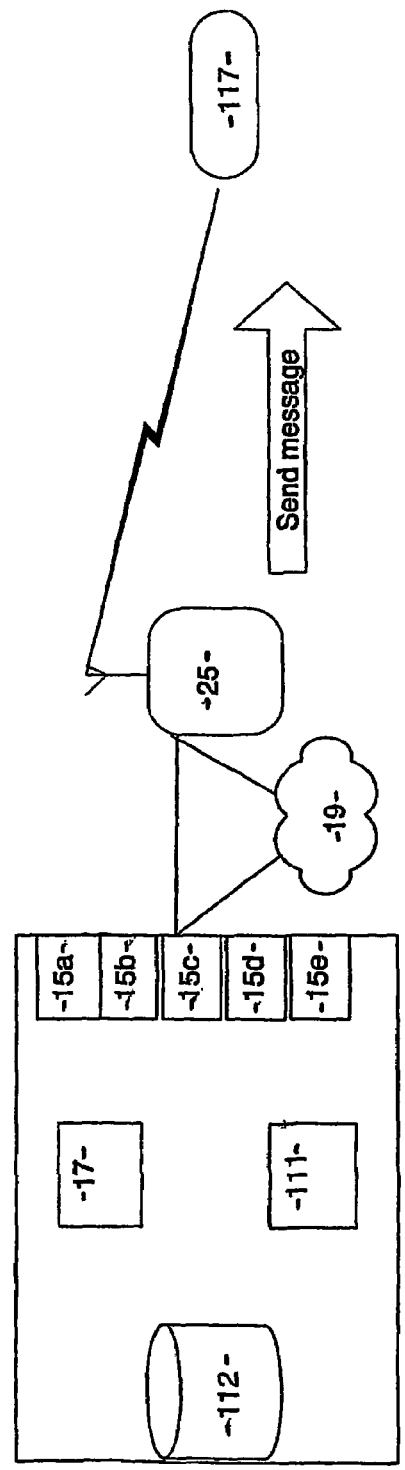

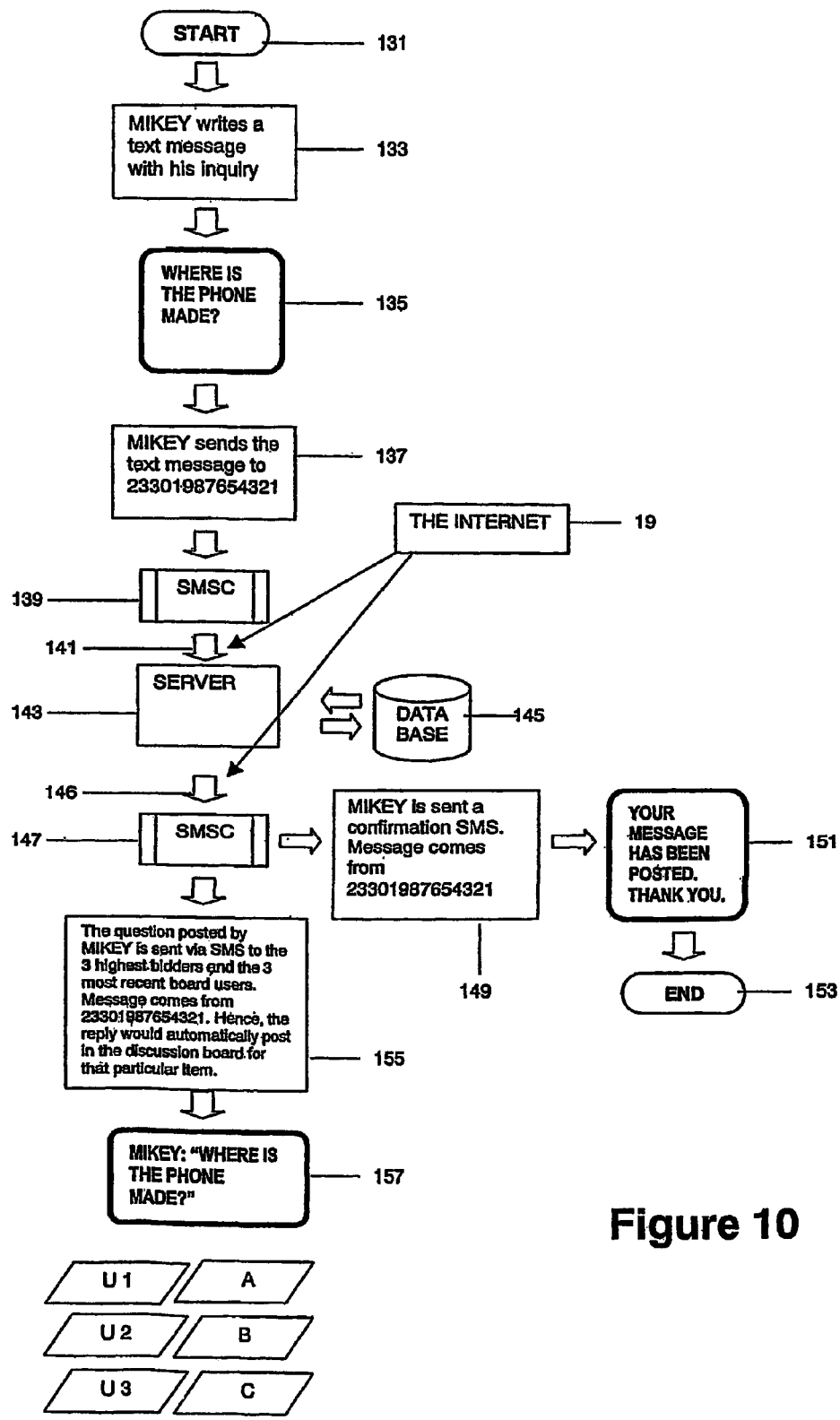
Figure 10
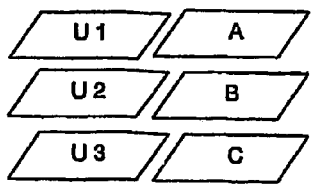

MESSAGING SYSTEM INVOLVING WIRELESS COMMUNICATIONS AND METHODS THEREFOR

FIELD OF THE INVENTION

The present invention relates to a messaging system that involves the communication of messages between a plurality of users and a host server where the medium between one of the users and the host involves wireless communications, and a method therefor. Users involved with wireless communications with which the invention finds particular, although not exclusive, application are clients in the form of digital radio apparatus, especially cellular radio telephones, pagers or other such communication apparatus.

This invention has particular, though not exclusive, utility for Short Message Service ("SMS")-based client applications and Global System for Mobile Communications ("GSM") network devices, such as mobile phones.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

Messaging systems have become popular with the increased usage of personal computers (PCs) and the development of computer networks that can link the same to enable communications between them to occur. For example, electronic Bulletin Board Systems (BBS) are provided for the purposes of sharing and exchanging electronic messages, and other files, in an analogous way that bulletin boards were used before the advent of electronic communication to post messages on, and which could be posted, read, and replied to, by large numbers of people. BBS's were originally independent of the Internet, but now many—if not most—have their own web sites, and messages and files are posted and read using the Internet to access the Bulletin Board. Typically, BBS's are used to allow people with shared hobbies and interest to share ideas etc. BBS's are also used as a means of selling products.

The Internet has extended the accessibility and the functionality of the BBS concept to provide for real time messaging in its own right. This tends to be embodied in what are generally termed instant messaging systems and in chat rooms.

Instant messaging systems provide a medium using the Internet and a service provider or transaction server, though which users or clients of a variety of different types can send and receive messages directly to and from one another. Specific messaging groups of 'buddies' can be formed so that messages are sent and received group-wide. The direct nature of this type of messaging is akin to email over the Internet, but can involve different client types. It dispenses with the posting of messages on a virtual or electronic bulletin board and instead is more concerned with direct transfer of a message from one client to an intended recipient or group of recipients. Thus instant messaging tends to be more user-specific, where individual users and the desire of one user to communicate a message to another user or group of buddy users, who generally are known to each other, drive it.

Chat rooms tend to retain the bulletin board concept by providing a virtual bulletin board where messages are retained and displayed sequentially to clients accessing the room. This still involves a downloading of messages to clients accessing the room and in this sense involves more or less instant messaging. However, chat rooms tend to be more subject matter specific and adopt a bulletin board type format that is more conducive to the transfer of information about a particular subject to a number of interested users or clients accessing the room. Access can be open to anybody accessing the server hosting the room, or can be restricted requiring membership and password access. The types of subject matter are limitless, where specific rooms can be set up for educational purposes, personal purposes and e-commerce of one description or another.

For example, a chat room may be specifically operated as a dating or personal matching service for members or clients accessing the room. A chat room may also be specifically operated for discussing or providing information on a particular topic of interest to persons accessing the session, eg Teenager Troubles, or Patent Protection for Business Methods.

The idea of a chat room can be extended further to provide for trade, such as a forum for buying and selling products amongst persons accessing the session where items or products are auctioned or otherwise traded.

For Internet based messaging systems such as instant messaging systems, BBS's, chat rooms, auction rooms etc, a user is required to "log in" to the server hosting the same in order to participate. This usually requires the input of both an email address and a password. The email addresses are needed particularly of access is restricted and/or involves some form of commercial activity, so that authenticating instructions and alerts can be sent to the participant (for example, because someone has posted a reply to his message), and the password is used to verify the identity of the participant.

All of these messaging systems exhibit the same limitations. A user in the main requires Internet access in the first place, to gain membership or approved access to the server hosting the messaging in order to read and post messages. In the case of BBSs, if a participant wants to know if someone has replied to his message, or wants to read any other messages/files posted to the BBS, he must wait for an email alert (which also requires him to log onto his Internet Service Provider), or regularly visit the BBS to check on the status of the messages on the BBS. This is time consuming and cumbersome. Where the BBS is set up for trading, or for auctioning, the time delay between making an offer, or a bid, acceptance of that offer or bid, and time delay between posting a question about the product and the response to such query can prove very frustrating both to buyer and seller.

It is now possible for users with mobile devices, such as cellular radio telephones, to access the Internet using the Wireless Application Protocol (WAP), typically when the website is also hosted in Wireless Markup Language (WML). Users are able to dial-up to so-called "WAP Internet gateways", and are able to access the Internet through a web browser provided with their mobile device. The user is therefore able to gain access to BBS's by means of their mobile device, but the same problems arise as with Internet access using other devices such as 4 personal computers (PC's). To use the WAP, a user must have a WAP-enabled device. It is not possible to access WML websites using older mobile devices. It is also typically more expensive to access the Internet using WAP devices, than using conventional PC;'s. At this stage, not all web sites are accessible via WAP devices, since not many websites have WML counterparts.

Another alternative to WAP access of content, BBS, Chat Rooms, or otherwise, is through the use of Sim Tool Kits or STK's and commands or keywords imbedded on the SMS message itself. STKs make it possible to access content using GSM devices in a manner similar to WAP access, i.e. through menu-driven navigation. The actual content accessed can be from the Internet or any other electronic source. STK's maintain a 'similar feel' to that of WAP in that a user is able to move up and down a menu of choices using his GSM device. STK's operate with SMS as the bearer and STK as the primary user interface on the mobile device. Though STK's can work on most legacy GSM devices, i.e., those that are not WAP-enabled, they do require the user to replace the SIM card of his mobile device. Another disadvantage of STK's is that the menu tree needs to be 'burnt' into the SIM cards. Once burnt, the tree structure of the menu cannot be altered.

The other practice is for users to access SMS-based content with the use of keywords. However, most users find the system unintuitive at best. Without the aid of instructions manuals, keywords are almost always forgotten, and if they are remembered, tend to be improperly used. Thus considerable amounts of SMS content traffic are improperly routed to the intended content providers.

In essence, menu type commands are difficult to maintain between a GSM device and a host server wherein the bearer of the instructions is SMS. The difficulty arises because a host server must "remember" what the previous action or choice of the user was in order to know where to take him next within the tree. Since SMS-based interactions between GSM devices and a host server take place in sessionless format, it is not readily apparent how the host server can accurately keep track of all the users previous actions. A session refers to interactions between a client and a server wherein a temporary electronic link is opened between the client and server for the real-time exchange of information. The session is terminated once the client is logged out or for any reason the electronic link is interrupted.

As described in the applicant's co-pending international patent applications PCT/SG00/00068, PCT/SG00/00069 and PCT/SG00/00070, all of which are incorporated herein by cross-reference, instant messaging systems can be provided that are effectively client type independent and can involve connectabililily with a server via the Internet or other computer network. Indeed, these systems can provide connectabililily with mobile cellular radio telephones that operate according to the GSM system and use SMS. As described, with SMS, a "Short Message Service Centre" ("SMSC") provides a server system through which all SMS messages that are sent and received by client subscribers are handled. The messages are short, typically limited to 160 characters in length, and are sent between subscribers of the GSM network, with the SMSC server system processing the messages for delivery to the right destination using the GSM mobile number of the intended receiver. Under the SMS protocol, the textual message from the sender is initially sent to the SMSC server system using the cellular telephone network. The SMSC server system then stores the message and allocates it to the intended recipient for downloading, in accordance with normal GSM protocol, when the recipient is Identified to be active within a cell. As such, SMS messaging is typically described as that employing a "store and forward" scheme.

These applications describe how it is possible to connect to the Internet using a particular protocol, by virtue of the SMSC server system, dependent upon the particular GSM phone and network manufacturer. For example, Nokia™ use Computer Interface Message Distribution protocol version Two (CIMD2).

As described in the applicant's co-pending international application PCT/SG00/00092, which is also incorporated herein by cross-reference, it is known to provide WAP and SMS technology in tandem. Wapit.com™ provides a BBS where messages are posted via WAP, and participants are informed by SMS once a reply has been posted. In this instance, replies via SMS are carried out by embedding commands within the SMS message itself.

The applicant's previous applications all facilitate instant messaging in a manner that can be easily adapted to provide communications with a GSM client. This can be achieved in variety of different environments in the manner described in the applicant's co-pending international application PCT/SG00/00127, which is also incorporated herein by cross-reference.

In a similar manner to which the applicant's instant messaging system described in the aforementioned applications enables efficient and convenient communications to occur with GSM devices, the present invention seeks to extend this utility to messaging systems per se that may involve the use of electronic BBSs, chat rooms, trading forums or other types of functionality where information may be conveyed from one user or client to another for any purpose.

In another aspect of the invention, the applicant demonstrates a process of navigating through content, from the Internet or any electronic source, using SMS as the bearer to obtain information, for example, on how to use the system or to access particular features. Such process maintains the feel of a menu 'tree', without requiring the use of WAP access or STKs.

DISCLOSURE OF THE INVENTION

It is an object of the invention to provide for the efficient and convenient communication of messages between users or clients and a host server, where the medium between one of the users and the exchange server involves wireless communications.

In accordance with one aspect of the invention, there is provided a messaging system for conveying messages between a host server and a client that is part of a wireless communication network having a messaging service to convey messages wirelessly therebetween using a messaging service server, the client having a client identifying number associated therewith to uniquely identify the client within the wireless communication network, and each message comprising a message packet including the address of an intended recipient of the message packet and the address of the sender of the message; the messaging system comprising a host server to which a plurality of clients may be selectively connected to convey messages therebetween, each of the clients having a client identifying number associated therewith to uniquely identify the client to the host server, the host server and the messaging service server being interconnected to provide for communications therebetween, whereby information regarding use of the messaging system can be sent from the host server to the client in response to a request from the client, the request comprising a message packet comprising an access code and data indicating the information requested, the access code uniquely identifying the host server to the messaging server, the host server being operable to return an information message packet to the client in response to the request message packet, the information message packet comprising the information requested by the client and an access code to be used by the client as a request message access code in response to the Information message packet, the access code identifying the host server and including a portion determined by the information included in the information message packet.

Preferably, the initial request message packet comprises a basic access code plus data indicating the information requested.

Preferably, the data comprises a keyword of alphanumeric, or alphabetic characters.

Preferably, subsequent request message packet access codes comprises the basic access code plus additional indices.

Preferably, the host server has processing means to:
(i) validate the client identifying number from the address of the sender of a request message packet received from a client;
(ii) process the access code from the address of the recipient in the message packet having a valid client identifying number associated therewith; and
(iii) generate the information message packet in response to a received request message using the request message packet access code as the sender address in the information message packet.

In accordance with another aspect of the present invention, there is provided a method for requesting information regarding the use of a messaging system for conveying messages between a host server and a client that is part of a wireless communication network having a messaging service to convey messages wirelessly therebetween using a messaging service server, the client having a client identifying number associated therewith to uniquely identify the client within the wireless communication network, and each message comprising a message packet including the address of an intended recipient of the message packet and the address of the sender of the message; the method comprising ascribing a client identifying number associated therewith to uniquely identify the client to the host server, compiling and sending a request message packet from the client to the host server, the request comprising a message packet comprising an access code and data indicating the information requested, the access code uniquely identifying the host server to the messaging server, and returning an information message packet to the client from the host server in response to the request message packet, the information message packet comprising the information requested by the client and an access code to be used by the client as a request message access code in response to the information message packet, the access code Identifying the host server and including a portion determined by the information included in the information message packet.

Preferably, the method further includes the steps of validating the client identifying number from the address of the sender of a request message packet received from a client, processing the access code from the address of the recipient in the message packet having a valid client identifying number associated therewith; and generating the information message packet in response to a received request message using the request message packet access code as the sender address in the information message packet.

Preferably, the method comprises exchanging a series of request and information message packets, each exchange relating to the selection of an option and the providing of a series of further options in relation to previous selection.

In accordance with yet another aspect of the present invention, there is provided a messaging system for conveying messages between a host server and a client that is part of a wireless communication network including a plurality of wireless clients having a messaging service to convey messages wirelessly therebetween using a messaging service server, each wireless client having a network identifying number associated therewith to uniquely identify the client within the wireless communication network, and each message comprising a message packet including the address of an intended recipient of the message packet and the address of the sender of the message; the messaging system comprising:
  a host server to which a plurality of clients may be selectively connected via a computer network to convey messages therebetween, each of the clients having a client identifying number associated therewith to uniquely identify the client to the host server;
  the host server and the messaging service server being interconnected by a further computer network to provide for communications therebetween;
  one of the clients of the host server being a wireless client and having the client identifying number corresponding to the network identifying number thereof;
  the host server having an access code to uniquely identify the host server to the messaging service server and a unique identification number ascribed to: (i) a prescribed action performed by the host server, and (ii) an entity that is the subject of the prescribed action;
  wherein messages sent between the host server and the one client in connection with a particular prescribed action and entity include:
  (i) a combination of the access code and the unique identification number ascribed to the particular action and entity as the address of the host server in message packets sent to or from the one client as the sender or the intended recipient, respectively, and
  (ii) the network identifying number as the address of the one client in message packets sent to or from the host server as the sender or the intended recipient, respectively;
  and wherein the messaging service server uses the access code in the address of the intended recipient or the sender to recognise messages sent to or received from the host server and rout messages accordingly.

Preferably, the prescribed action comprises invoking a routine on the host server associated with accessing an electronic bulletin board and the entity is the subject or topic to which the bulletin board relates.

Preferably, the message is concerned with either reading, posting or responding to a message on the bulletin board.

Preferably, the prescribed action comprises invoking a routine on the host server associated with participating in a commercial transaction and the entity is a product or service that is the subject matter of the transaction.

Preferably, the commercial transaction is an auction and the message is concerned with a bid at the auction.

Preferably, the prescribed action comprises invoking a routine on the host server associated with personal services and said entity is the particular type of personal service.

Preferably, the prescribed action comprises invoking a routine on the host server associated with a chat room and said entity is the particular subject matter or topic of the chat room.

Preferably, the prescribed action comprises invoking a routine on the host server associated with transferring the message directly to another client or group of clients of the host server as specified in the message packet and said entity is the specific client or group of clients concerned.

Preferably, the group of clients are those stored as buddies of the client sending the message in a database of the host server.

In accordance with yet another aspect of the present invention, there is provided a method for conveying messages between a host server to which a plurality of clients may be selectively connected via a computer network to convey messages therebetween and a client that is part of a wireless communication network including a plurality of wireless clients having a messaging service to convey messages wirelessly therebetween using a messaging service server, each wireless client having a network identifying number associated therewith to uniquely identify the client within the wireless communication network, and each message comprising a message packet including the address of an intended recipient of the message packet and the address of the sender of the message; the method comprising:

ascribing a client identifying number to each client of the host server to uniquely identify the client to the host server, the client identifying number for the client that is part of the wireless communication network corresponding to the network identifying number thereof;

ascribing an access code to the host server to uniquely identify the host server to the messaging service server, and a unique identification number indicative of: (i) a prescribed action to be performed by the host server, and (ii) an entity that is the subject of the prescribed action;

compiling messages sent between the host server and the client of the wireless communication network in connection with a particular prescribed action and entity to include:

(i) a combination of the access code and the unique identification number ascribed to the particular action and entity as the address of the host server in message packets sent to or from the one client as the sender or the intended recipient, respectively, and (ii) the network identifying number as the address of the one client in message packets sent to or from the host server as the sender or the intended recipient, respectively; and routing messages through the messaging service server using the access code in the address of the intended recipient or the sender to recognise messages sent to or received from the host server.

BRIEF DESCRIPTION OF THE DRAWINGS

The invention will be better understood in the light of the following description of one specific embodiment thereof. The description is made with reference to the accompanying drawings, wherein:

FIGS. 5 to 7 are schematic diagrams showing generally how a user can register with the trade and auction service application;

FIG. 10 is a flow chart of the discussion process with wireless clients associated with the auction service format;

BEST MODE FOR CARRYING OUT THE INVENTION

The preferred embodiment of the best mode of the invention is directed towards a messaging system and a method of instant messaging involving the communication of messages associated with one or more services provided between a host server and a number of users that are registered with the host server, where at least one of the users is a client of a wireless communication network that has its own messaging service.

In the present embodiment, the wireless communication network is a GSM network and the messaging service is SMS.

Figure 1:
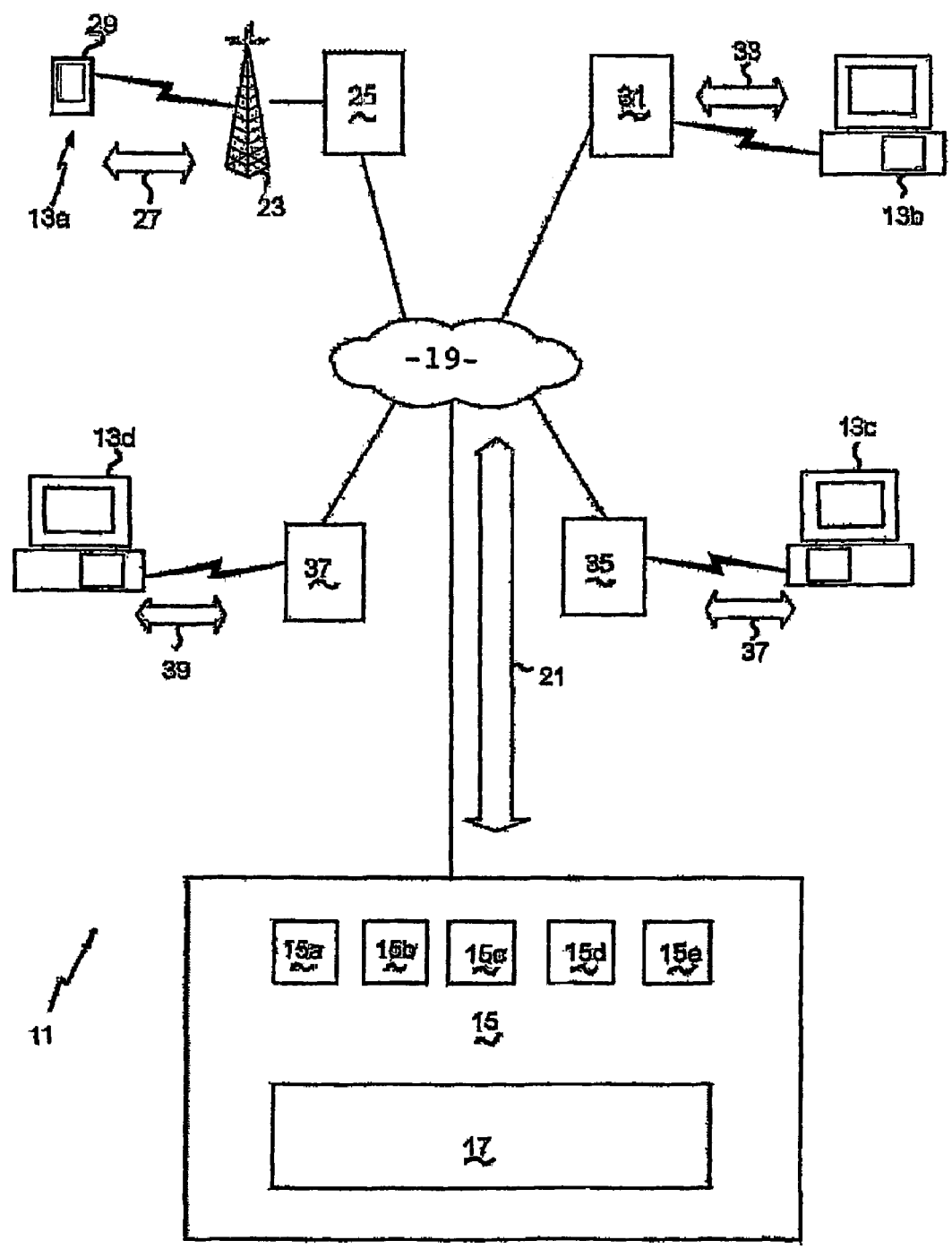
FIG. 1 is a schematic block diagram showing the general arrangement of the messaging system with different client types connected to the host server.

As shown in FIG. 1 of the drawings, the messaging system 11 of the embodiment essentially comprises a plurality of clients 13 of the same or different types 13a, 13b, 13c and 13d, and a host server 15. The host server 15 comprises a plurality of gateway servers 15a to 15d and a user information database 17. The gateway servers are selectively connected to each of the clients 13 via a computer network, which in the present embodiment is the Internet 19, for sending and receiving messages and commands as represented by the arrow 21 in connection with a service provided by the host server 15 to the users.

The clients 13 are selectively connected to the host server 15 via the Internet 19 when desired to utilise a particular service using any or all of the following terminals or appliances:

a GSM mobile client 13a connected via a GSM cell site 23 and SMSC server system 25, where SMS messages 27 are transmitted between a GSM device 29 of the client, such as a mobile phone, and the SMSC server system 25, a PC-based client 13b connected via an Internet Service Provider ("ISP") 31, where message packets 33 are communicated between the PC client application of the client and the ISP 31, an internet browser client 13c via an ISP 35, where HTML message packets 37 are conveyed between the browser client 13c and the ISP 35, and an email client 13d via an ISP 37, where email message packets 39 are communicated between the email client 13d and the ISP 37.

A client identifying number uniquely identifies each client to the host server 15. This number is mapped to the actual address of the client and stored within the user information database 17 of the host server.

Wireless clients that are part of a wireless communication network such as GSM mobile clients 13a also have a network identifying number to uniquely identify the wireless client to the wireless communication network, in this case the GSM network of which the mobile client 13a is a member. This number is stored within the GSM network and is used by mobile clients to identify intended recipients of SMS messages sent by mobile clients and the address of the sender of such messages to the SMSC server system to effect the message transfer. In the present embodiment, the network identifying number is simply the GSM telephone number of the GSM device of the mobile client 13a.

The SMSC server system 25 controls and manages the transmission of all SMS messages between its wireless client subscribers. The SMSC server system 25 includes a database within which the network identifying numbers of all SMS subscribers is stored along with SMS message packets 27 sent by a wireless client subscriber to targeted recipients that may or may not be connected or available to the cellular network at the instant of sending. These message packets are subsequently downloaded automatically for targeted recipients when the GSM device of a recipient is switched on and is connected or otherwise available to receive messages within a cell site.

As mentioned, the host server 15 is directly connected to the SMSC server system 25 via the Internet 19. In alternative embodiments, however, the SMSC server system may be connected via a direct electronic link. In this manner, messages or short messages can be sent via direct electronic or data lines through the Internet from the host server 15 to the SMSC server system 25 for subsequent delivery to subscribers of SMS on the GSM network. Short messages are sent and received between the host server 15 and the SMSC server system 25 using the GSM network's message protocol. In the present embodiment, the particular protocol used is CIMD2, which is a system adopted by GSM mobile phone and network manufacturers such as Nokia and Ericsson. The system, however, can support other protocols such as Short Message Peer-to-Peer Protocol ("SMPP").

An important principle of the messaging system is that the host server 15 ascribes the network identifying number of a wireless client to be the client identifying number of the messaging system. In this manner, the host server 15 is compatible with the SMSC server system 25 in its identification and addressing of wireless clients to facilitate the transfer of messages between the host server and a wireless client via the SMSC server system.

An access code is also ascribed to the host server 15 to uniquely identify it to the SMSC server system 25. The access code is used in messages sent between wireless clients 13a and the host server 15 so that the SMSC server system 25 can distinguish SMS messages from a wireless client that are intended to be sent to the host server 15, from other SMS messages handled by the SMSC server system that are associated with the SMS messaging service provided by it and which are not intended to be sent the host server.

This access code effectively constitutes the address of the host server 15 from the perspective of the SMSC server system 25. In the present embodiment, the SMSC server system 25 is particularly configured to decode the access code from the first few digits of a network identifying number representing the target address or GSM telephone number of an intended recipient of an SMS message sent by a wireless client on the GSM network. The SMSC server system 25 is provided with appropriate routing software to direct any message received by it to the host server, once the access code is decoded from the network identifying number, via the Internet in the present embodiment.

A unique identification number ("UIN") is ascribed to different services provided by the host server 15 for its clients. The UIN is indicative of: (a) a prescribed action to be performed by the host server for a client, and (b) an entity that is the subject of the prescribed action.

In the present embodiment, the prescribed actions that are performed by the host server 15 include:
  invoking a routine on the host server associated with accessing an electronic bulletin board;
  invoking a routine on the host server associated with participating in a commercial transaction;
  invoking a routine on the host server associated with personal services;
  invoking a routine on the host server associated with a chat room;
  invoking a routine on the host server associated with transferring the message directly to another client or group of clients of the host server as specified in the message packet, which will hereinafter be referred to as the instant messaging application.

The entities that are the subject of the prescribed actions respectively are:
  the subject or topic to which the bulletin board relates;
  a product or service that is the subject matter of the commercial transaction;
  a particular type of personal service;
  a particular subject matter or topic of the chat room;
  a specific client or group of clients concerned with receiving the message.

Accordingly, different UINs are ascribed for different prescribed actions and different entities associated with the prescribed action.

An important aspect of the present embodiment is that in the case of a wireless client, the UIN of a prescribed action and entity to which a message relates, is combined with the access code of the host server, to constitute the address of the host server 15. Moreover, as far as the GSM network is concerned, this combination of the access code and the UIN is the network identifying number for the host server, and is used as the intended recipient's address or effective GSM number in an SMS message intended to be sent by a wireless client to the host server. It is similarly used as the sender's address for any message sent by the host server to a wireless client in connection with any service provided by the host server to the wireless client.

The configuration and operation of the host server 15 and its clients 13 will now be described with specific reference to the various services performed thereby as outlined by the prescribed actions and entities referred to above. The host server 15 is configured to take on a particular character and function dependent upon the particular service provided by it. This configuration is embodied in software and so the description will focus on the particular functions performed in undertaking the particular prescribed actions in association with the entities that are the subject of the action in sufficient detail to enable a software programmer equipped with common general knowledge of available program development tools to write the software required to implement the functionality of the host server.

Instant Messaging Application

When the UIN in a message packet received from a client indicates that an instant messaging function is to be performed by the host server 15, the host server performs the following basic actions on behalf of the user: (i) sending and (ii) receiving instant messages, and (iii) detecting users who are "online", i.e., connected to the internet or otherwise accessible by instant messaging right at, or around, that particular moment in time. Users are also referred to as "buddies" in the instant messaging "IM" scenario.

There can be no absolute assurance that a user is actually online or reachable at a given moment by instant messaging due to the less than perfect stability of the Internet and GSM networks, mobility of the GSM subscriber, and so on. However, the present embodiment envisages providing a reasonable assumption as to whether a user is likely to be reachable or not reachable at a given moment due to certain activities undertaken by the host server 15 that will be described in more detail later.

The host server 15 is specifically programmed to undertake any of the aforementioned basic actions if triggered or instructed to do so by a client accessing the host server. This triggering occurs when the client sends an electronic prompt or command in a message packet sent to the host server. For example, a GSM device will do this by sending an SMS message to the host server, an email client will do this by sending an email to the host server, a browser client will do this by sending instructions or commands to the host server via the Web, and a PC-based application will do this by sending commands to the host server via an electronic or internet link.

The format of the delivered information, such as the actual message or notification of who is online, necessarily depends on the appliance type. For example, with a GSM device the format will be in SMS format, with an email, it will be in email form, and with a browser client it will be in HyperText Markup Language ("HTML") form.

Figure 2:
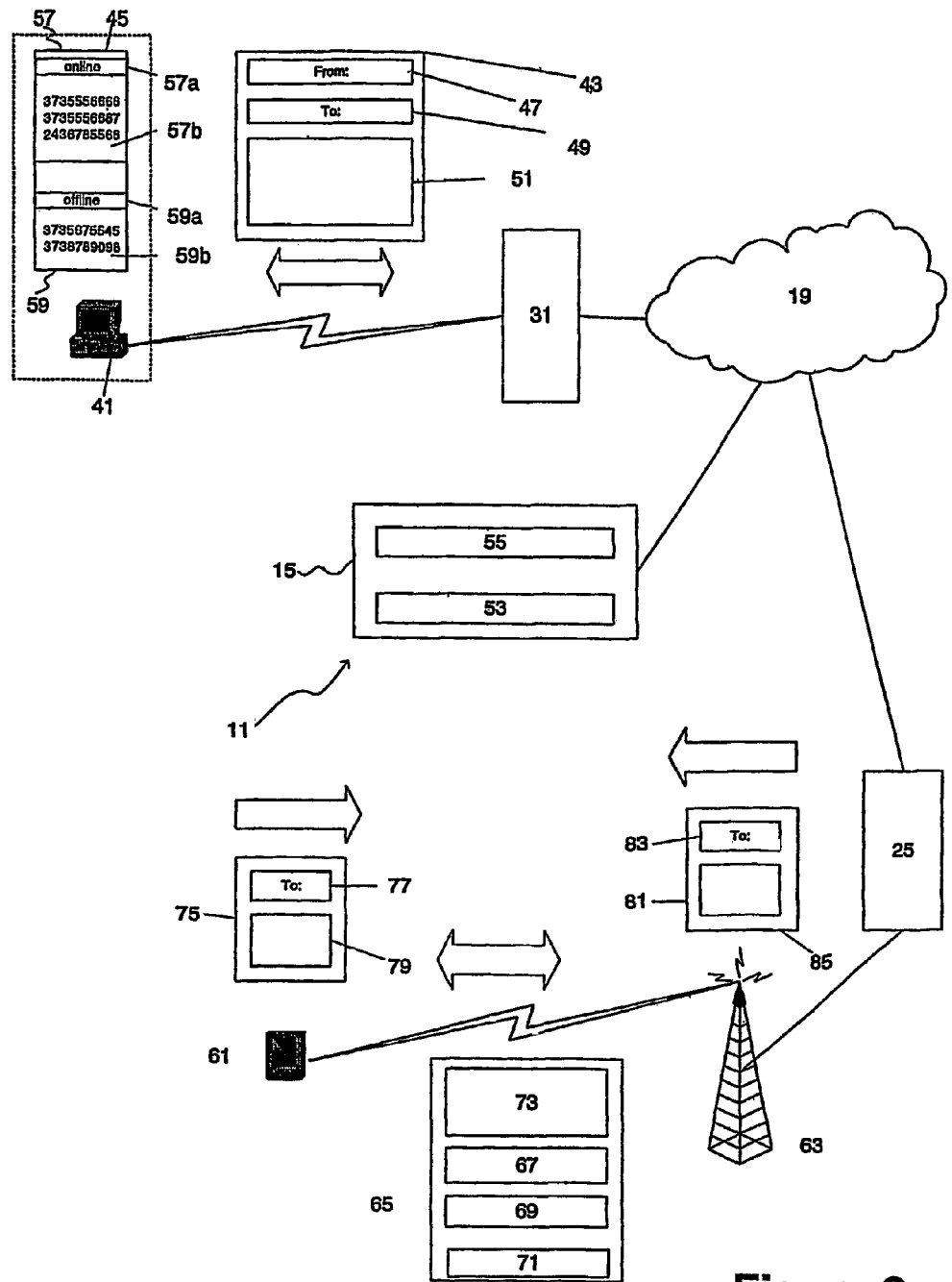
FIG. 2 is schematic block diagram showing the embodiment of the messaging system adapted for an instant messaging application with PC-based and GSM device client types connected to the host server.

As the invention is primarily concerned with the instant messaging application as it relates to wireless clients, the basic functions of the host server 15 and client 13 with respect to instant messaging will be described in the context of how they operate with respect to a GSM client and a PC-based client as shown in FIG. 2 of the drawings. Reference should be made to the applicant's co-pending International Application PCT/SG00/00068 for a description of how the basic functions operated with other client types.

Dealing firstly with instant messaging using a PC-based client application, as shown In FIG. 2 of the drawings, an IM user's internet-based PC application 41 resides as a program on the PC of the user. The program provides for the various functions of sending and receiving a message and notification of buddies that are online by two separate "pop up" panes, a sending and receiving message pane 43 and a buddy online pane 45.

The sending and receiving message pane 43 comprises a "From" header 47 for identifying the client identifying number (CIN) of the client sourcing the message, a "To" header 49 for Identifying the CIN of the client to whom the message is destined or targeted, and a message content space 51 for displaying the text of the instant message sent or received. In the actual PC application, the creation of this message may in fact be automated, with the sender's CIN and the recipient's CIN being automatically included in the message when the computer icon of the recipient's name (the buddy) is double-clicked on the PC-based client application 41.

In order for messaging to occur, the host server 15 includes an IM server application 53 where the enabling functions reside and a user status database 55 that stores details of users amongst whom instant messages are sent and status details of the enabling functions, which are continuously updated. Accordingly, communication between various IM users' PC applications 45 and the host server 15 occurs via the Internet 19 and the users' Internet Service Provider ("ISP") 31.

Sending messages from the PC-based client application firstly requires the user 41 to be connected online to the Internet 19 via the user's ISP 31 and to select a "send message" option from a menu provided on the user client application specifying the available functions of the application. The user then needs to enter the message in the message content space 51 provided for in the sending and receiving message pane 43 and specify the target recipient by way of the target recipient's CIN or a proxy for it (such as his "buddy" name, for instance) in the "To" header 49. The program is designed to automatically display the user's CIN in the "From" header 47, by virtue of the user being deemed to be the sender as a consequence of the user selecting the "send message" option.

The program is designed to provide a visual notification to the user that a message has been received and can thus be read by the user selecting a "read message" option from the menu. On selecting the same, the sending and receiving message pane 43 will be displayed with the "From" header identifying the CIN of the sender of the message and the "To" identifying the CIN of the recipient, being the user.

The buddy online notification pane 45 comprises two halves, the top half 57 and a bottom half 59. The top half 57 has a header 57*a* labeled "online" and a space 57*b* in which all of the CIN's of buddies that are online, as previously defined, are listed. The bottom half 59 has a header 59*a* labeled "offline" and a space 59*b* in which all of the remaining CIN's of buddies of the user are listed that would be offline. The actual presentation of this information may vary slightly in the PC application, depending on the user's preference and the continually changing design of the application's Graphical User Interface ("GUI"). However, the basic information imparted remains the same.

The provision of such functions and the design of panes in a PC-based IM client application are well known in the art. Accordingly alternative modes of the invention may accomplish the same basic functions by different types of visual notifications, such as changing colours or pop out lists of icons identifying particular users or buddies.

With respect to providing these same functions in a GSM-based client, a necessarily different arrangement is provided where use is made of the existing SMS system used on GSM networks. In the GSM-based client, a GSM device 61 such as a mobile phone, is the terminal or appliance, and the user of this device operates it as a subscriber to the GSM network where telecommunications between subscribers are transmitted wirelessly through GSM cellular sites 63 disposed to create a cellular network.

A subscriber-to-subscriber SMS message on a GSM network includes a message packet 65 comprising the sender's network identifying n umber (NIN) (the GSM mobile phone number of the sender) 67, the target recipient's NIN (typically the GSM mobile phone number of the receiver) 69, the GSM mobile number of the SMSC server system 25 which will process the message 71, and as much as a 160-character message 73.

Sending messages from the GSM mobile device 61 to another user of the messaging system 11 is accomplished by entering an SMS message 73 in the GSM device and specifying the target recipient's NIN in the "To" address 69. The actual entry steps are specific to the GSM device manufacturer.

Importantly, the NIN address of the recipient is a combination of the numeric access code (as defined by the GSM carrier) and the target recipient's CIN. As previously described, the access code is specific to the GSM carrier and is used to indicate to the SMSC server system 25 that the SMS is to be forwarded to the host server 15.

The GSM device 61 receives instant messages via the messaging system 11 just as it would receive typical SMS messages from the GSM network's SMSC server system 25. Instant messages received by a GSM client from the host server 15 would indicate a CIN in the "From" or "Reply To" address 67 comprising the combination of the access code plus the CIN of the user.

It is important to note in the present embodiment that the CIN of the user in the instant messaging application actually constitutes the UIN that is decoded by the host server to determine the necessary prescribed action with the appropriate entity—in this case sending the message packet as an instant message to the indicated recipient.

The IM server application 53 is designed to provide buddy online notification to GSM clients by way of SMS messages containing online buddy information. The IM server application 53 sends these messages to the GSM client 61 on triggering by a GSM client. The trigger for such a message may be automatic or manual, depending upon the specification of the user.

As shown in FIG. 2, manual triggers are accomplished by a user of a GSM device 61 sending an SMS message 75 containing a UIN designating a prescribed SMS command to the host server 15. For example, the message packet for this SMS message 75 will contain the access code of the host server 15 combined with the UIN for the prescribed "who is online command" as the NIN in the "To" address 77. The host server 15 is provided with processing means so that when it receives this SMS message containing the "who Is online command" from the SMSC server system 25, it decodes the UIN to determine that it is an instant messaging application and then invokes the IM server application 53 to attend to the prescribed action. In the present instance of a manual triggering, this will involve sending back an SMS message or a series of SMS messages 81 to the sender of the message notifying or listing the CIN's, and pseudonyms if entered, of those buddies of the sender who are online. Alternatively, the message packet for this SMS message 81 may contain the CIN 83 of a particular GSM client user and a message 85 indicating that he or she is online or other message.

In the case of automatic triggering, the IM server application 53 is designed to send an SMS notification to the particular GSM client that a particular user or a group of users (buddies) are online or not, when the IM server application detects their online presence or a change in such. Accordingly, with automatic triggering, there is no prompting required by the GSM user.

The instant messaging application of the present embodiment works on the principle of using a single CIN/UIN to identify a user regardless of their client type and the matching of that one and only UIN to all of the client types of that user that can be handled by the host server. Thus the IM server application 53 permits the user to access their account with any of the following client types: PC based client application, GSM client, internet-browser client, and email client. Regardless of the client type, the IM server application 53 can recognize the user, matching them to their particular CIN/UIN accordingly. From there on, the user has access to the basic functions of the IM system, such as send messages, reply to messages, receive messages, and check who is online, among other basic IM functionalities.

The manner in which this matching of CIN/UIN's to appliances and users by the IM server application 53 will now be described for the GSM device client type with reference to FIGS. 3 and 4. The manner in which this is done for other client types is described in the applicant's co-pending International Application PCT/SG00/00068.

With respect to a GSM client application provided by a GSM device 85, the IM server application 53, which in practice is run under the multiple gateway servers 15a to 15e, is connected to the SMSC server system 25 via the Internet 19. The SMSC server system 25 in turn wirelessly communicates with various GSM cellular sites 87 to establish communication with the mobile user's GSM device 85.

Figure 3:
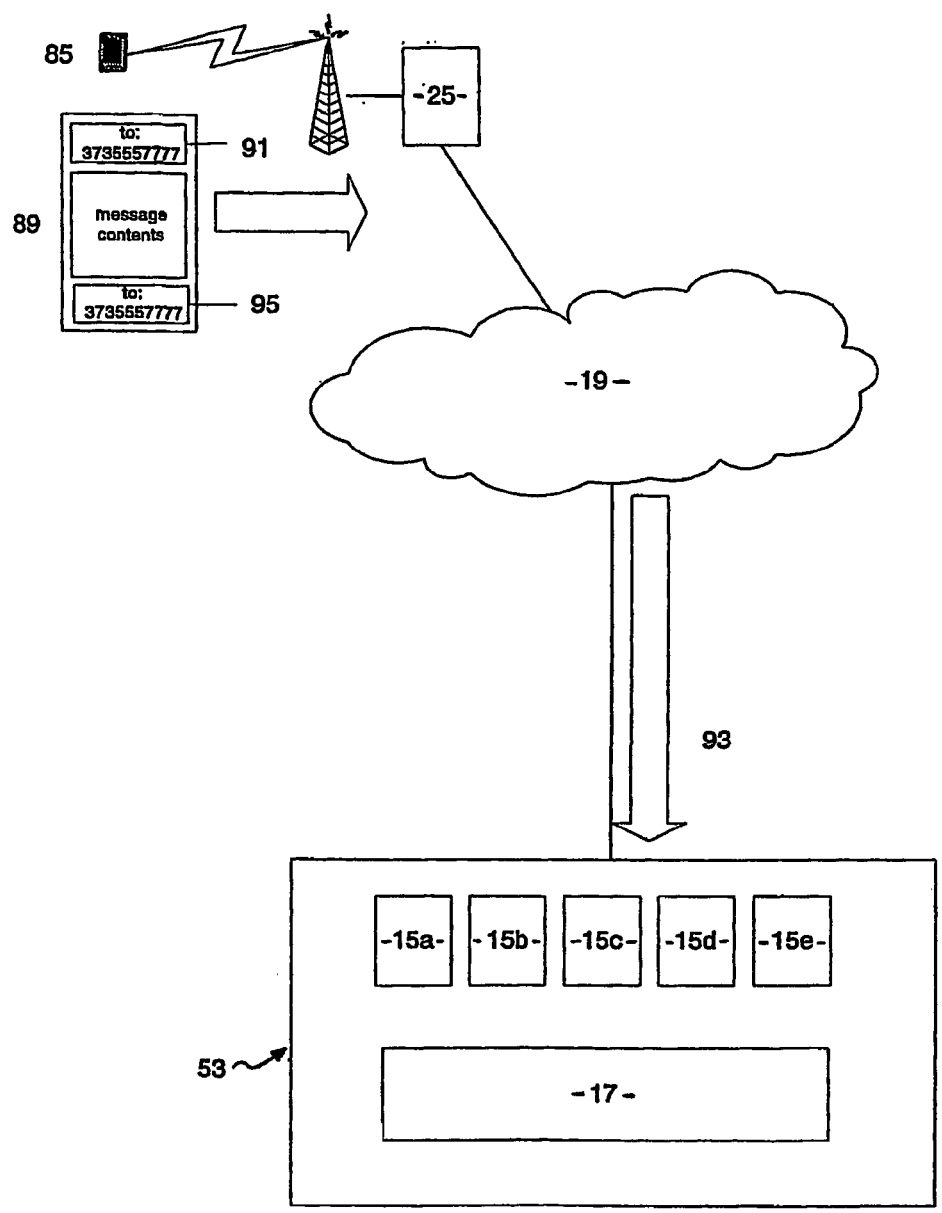
FIG. 3 is a schematic block diagram showing how a message is transmitted to the host server from a GSM device client type.

In the case of an instant message being sent from the GSM device 85 to the host server 15, as shown in FIG. 3, the SMSC server system 25 initially receives the message packet 89 from the GSM device 85 and on decoding the access code of the recipient's address in the "To" address field 91, transmits the message packet on to the host server 15 via the Internet 19. As previously mentioned, the GSM client user can send messages in message packets 89 to clients of the host server by using its local SMS, with the address formed by appending an access code (as defined by the GSM carrier) to the recipients' CIN. Notifications of buddies online are also accomplished through SMS messages sent back to the user's GSM device from the host server.

The host server 15 on receiving the message packet 89, as represented by arrow 93 then uses its processing means to match the user's (unique) CIN, which in this case is the GSM mobile phone number of the user, In the "From" address field 95 to the stored CIN of registered users of the host server in the user information database 17 to validate the CIN of the sender of the message packet and then to process the UIN extracted from the "To" address field 91 to invoke the required routine to perform the prescribed action, in this case the instant messaging application, with the specified entity. The host server in the present embodiment uses the (country code)+(area code or GSM carrier code)+(mobile phone number) to form the GSM user's CIN when the user first registers using his GSM device. Hence, matching is straightforward since all SMS message packets include the GSM mobile number of the sender in the "From" address field 95.

On invoking the instant messaging application, the IM server application 53 determines the user status of the target recipient of the message as specified in the UIN extracted from the "To" address field 91, by accessing the user information database 17. The IM server application 53 also establishes the client types that may be accessed for the target recipient based on the user settings for that recipient stored in the user information database to ensure proper routing of the message to the selected client devices of the recipient. This essentially involves adapting the CIN of the recipient in the appropriate format of the particular client type of the user that is to be addressed by the message. In the case of the PC-based and browser-based client applications, this will simply be the UIN itself. In the case of the GSM application, it will actually be the telephone number of the target recipient, which is the UIN in any event in this example. In the case of the email-based client, it will simply be the email address of the targeted recipient. As the email address is alphanumeric, the email address is actually mapped into a numeric address.

Figure 4:
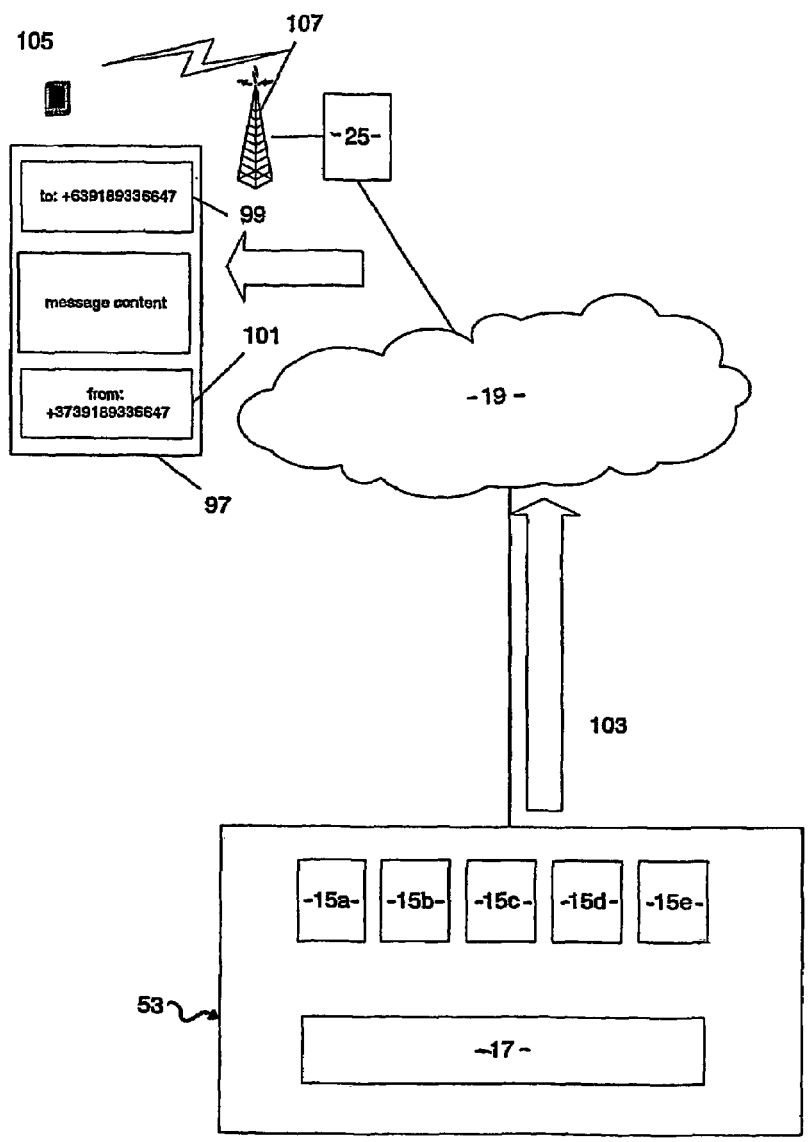
FIG. 4 is a schematic block diagram showing how a message is received by a GSM device client type from the host server.

In the case of the client type for the target recipient being a GSM device, the message packet 97, as shown in FIG. 4, is processed by the IM server application 53 by correctly formatting the address fields of the message packet 97 for routing to and by the SMSC server system 25 as an SMS message. The formatting involves stripping the access code from the "To" address field 99 of the message packet 97 and adding the access code to start of the CIN of the sender indicated in the "From" address field 101.

The message packet is then sent directly to the SMSC server system 25 of the GSM network via the Internet 19, as represented by the arrow 103. The GSM client user eventually receives the message packet 97 under the SMS of the GSM network when the GSM network detects the availability of the specified GSM device 105 of the user to receive messages via one of the GSM cellular sites 107.

In the specific examples shown in FIGS. 3 and 4, the user sending the message has the CIN '639189336647' and the user receiving the message has the CIN '639185556666'. The GSM client, however, needs to append the access code allocated to the host server by the SMSC server system 25, in this example '373', to the start of the CIN of the targeted recipient for dialling out through the GSM network, if the targeted GSM recipient were to reply to the message by simply "replying to" the message—i.e., the sender's NIN is automatically entered in the "sent to" numeric address.

It should be noted in all instances that the user's CIN is the user's primary identifier for the purpose of handling instant messages addressed to them or originating from them. The one-to-one matching of this UIN to the unique identifiers for each appliance creates the basic foundation for the single account system of the IM system.

A key reason for using a numeric such as the CIN is speed. This is particularly useful in accomplishing the fast transmission of instant messages with GSM devices. In order to respond to an IM message received by a GSM device user, all the sender is required to do is to click the reply button, whereupon the CIN of the sender is automatically entered into the GSM device's "reply to" address. Moreover, originating messages by the GSM device user is likewise easy and fast. All the user has to do is to enter in the "send to" address the intended recipient's CIN appended to the GSM carrier's access code. This combination access code-CIN can in fact be stored in the address books of most GSM devices, thereby facilitating fast recall of addresses and transmission of messages.

Commercial Transaction Application

As indicated above, the present embodiment also provides for the host server 15 being designed and configured to invoke a routine for performing a prescribed action in the form of a commercial transaction. With e-commerce numerous types of commercial transactions have evolved to which the present invention has utility. The description of the present embodiment, however, will be limited to describing the application of the invention to a trade and auction service with reference to FIGS. 5 to 8.

When the UIN in a message packet received from a client indicates that the message is concerned with the trade and auction service provided by the host server 15, an auction server application 111 on the host server is invoked.

The auction server application 111 essentially comprises a registration handling means (registration handler), a message dispatching means (message dispatcher), a message receiving means (message receiver), a unique identification number assigning means (UIN assignor), an auction database means (auction database 112), and a trade and auction handing means (auction handler). These are embodied in the form of program routines that are continuously executed under the control of an operating system in the auction server application 111 and thus automate the registration and bidding process.

The registration process of a prospective user of the auction and trade service is undertaken requiring the prospective user to have a PC-based or browser-based client run on a computer 113 that is able to access the host server 15 via the Internet 19 using the user's internet service provider (ISP) 115, as well as a GSM device 117.

The host server 15 is also linked directly or through the Internet to the GSM network's SMSC server system 25 of which the GSM device 117 of the user is a subscriber, in the manner previously described. The message dispatcher and the message receiver of the auction server application 111 communicate directly with the SMSC server system 25 via the host server 15 to send and receive short messages or commands via SMS, once the host server invokes the auction server application.

In the present embodiment, the prospective user via the computer 113 accesses a registration form made available by the auction server application 111 to prospective users of the trade and auction service through the host server 15. The registration form includes fields in which the user must enter essential data for the registration process, and further fields in which the user may enter optional data if desired.

When the prospective user has entered data into the requisite fields in the registration form, the prospective user then submits the data to the auction server application 111 provided on the host server 15. This can be achieved in a number of ways, such as using a form-based HTML web page for the registration form, where the user can submit the entered data to the auction server application 111. Upon receipt of the essential and optional data from the user's computer 113, the auction server application 111 invokes the registration handler.

The registration handler creates a new entry in the main user information database 17 of the host server 15 to temporarily register the user with the host server for the trade and auction service facility provided on the host server. This entry contains prescribed essential and optional data for registration purposes. In the embodiment, the essential data for the trade and auction service comprises the user's name, address, an NIN of a messaging-capable wireless device owned by the user such as a GSM mobile phone number, e-mail address, and nickname. The optional data in the embodiment comprises the user's date of birth, for instance.

The registration handler assigns the user a temporary password, which is stored in the user information database 17 without being communicated to the user at this stage. The data for the user stored in the user information database 17 is marked as being inactive until an authentication process is completed.

FIG. 6 shows a first part of the authentication process used in the embodiment. The authentication process for new users registering with the auction server application 111 is performed by the registration handler. As shown, the registration process initially involves the registration handler obtaining the temporary password assigned to the user and the user's GSM mobile phone number from the user information database 17.

The registration handler then instructs the message dispatcher to send an SMS message to the user's mobile telephone 117. The user's GSM mobile telephone number is used as the "recipient" field in the SMS message. The message text of the SMS message contains the temporary password assigned to the user by the registration handler. The message text may also contain an instruction to the user to enter the password and submit it to the host server 15 using their computer 113.

Figure 7:
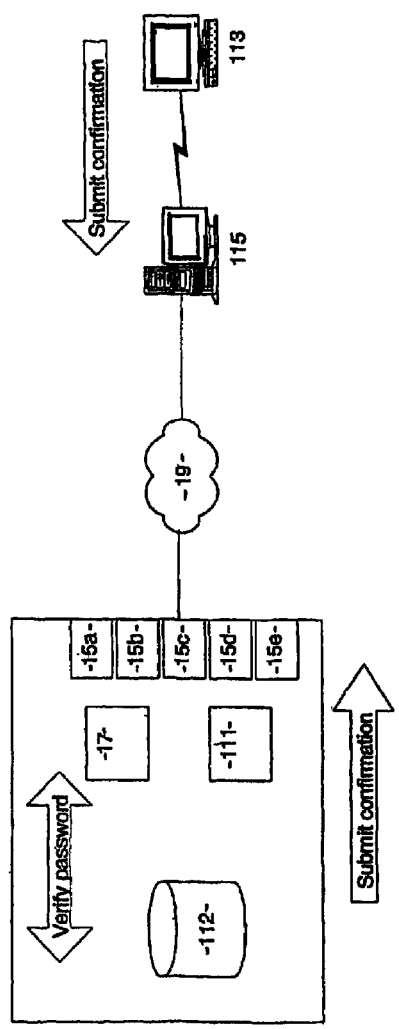

FIG. 7 shows a second part of the authentication process. As shown, upon receiving the SMS message on their GSM mobile telephone 117, the user submits the temporary password to the host server 15 using the computer 113. In the embodiment, once the user has submitted data entered on the registration form to the host server 15, the auction server application 111 takes the user's computer 113 to a further HTML web page that informs the user they will shortly receive a message on their mobile phone that contains a temporary password. The further HTML web page then instructs the user to enter the password in a field provided on the web page and submits it to the host server 15. The further HTML web page then explains that once the password has been verified by the auction server application 111, their account will be activated.

The user enters the password in to their computer 113 and submits the information to the host server 15. The information received by the host server 15 must also identify the user. This can be achieved in a variety of ways, such as through the use of "cookies". A "cookie" is a data file residing on the computer 113 that contains information based on the prior activities of the user, which also allows the host server 15 to identify a user or someone just visiting the URL address corresponding to the auction server application 111. For that session, a cookie, which identifies the user, is associated with that user's account.

Upon receipt of the password, the host server 15 invokes the auction server application 111 to verify that the submitted password is the same as the temporary password stored in the user information database 17. If the password is correct, the account for the user is marked as active and the user's computer 113 is directed towards another HTML web page that informs the user his registration was successful. Alternatively, if the submitted password does not correctly match the unique password stored in the database 17, the user's computer 113 is directed towards a HTML page that informs the user their registration attempt was unsuccessful and to try again.

Several attempts are allowed before the message handler bars the user from further attempts.

Although the embodiment has been described with the authentication process consisting of a message being sent to the user's GSM device and the user entering a confirmation via their computer, it should be appreciated that in other embodiments alternative registration procedures may be adopted that would still require the user to specify their mobile phone number in order to activate their account.

For example, upon submitting the registration data, the user could be taken to a web page that contains the temporary password and instructed to send via his GSM device 117 an SMS message containing their password to a particular telephone number. That telephone number would consist of a concatenation of the numeric access code of the host server 15 for the SMSC server system 25 and a UIN comprising the numeric address assigned by and recognized by the host server 15 as that for registration purposes. The user's SMS message would then be forwarded from the SMSC server system 25 to the host server 15, and upon decoding of the UIN extracted from the concatenated number entered as the recipient's address, the auction server application 111 would be invoked and the message receiver engaged to handle the message. The user's id and password can then be verified, since the message text contains the password and the user's mobile telephone number will be present in the "sender" field of the SMS message.

In an enhancement to the registration process, the auction server application 111 causes the host server 15 to dispatch a message to the user's mobile phone 117 containing a message that instructs that user to enter the temporary password displayed on the HTML page appearing on his computer 113. This message has as its "sender" a number comprising the concatenation of the numeric access code for the host server 15 with the SMSC server system 15 of the GSM network that the user's GSM device subscribes to and a UIN designating access to the registration handler. In many GSM devices, sending an SMS containing the temporary password can be accomplished by simply hitting the "reply" key on their GSM devices. The "sender's" address, which is the concatenation of the numeric access code and the UIN pertaining to the registration handler, is automatically inserted in the "recipient" field of the new SMS message, thereby simplifying the sending of the temporary password.

In this particular method of registration, the message dispatcher inserts into the "sender" field of the SMS message a number comprising the concatenation of the numeric access code and the UIN assigned by and recognized by the host server 15 as that for registration purposes with the auction server application 111. The numeric access code is used by the SMSC server system 25 to identify the message as being intended for the host server 15. Any SMS messages received by the SMSC server system 25 whose "recipient" field commences with the numeric access code of the host server 15 will be forwarded from the SMSC server system 25 directly to the host server 15. The host server 15 will subsequently decode the UIN, and upon establishing that the message relates to the trade and auction service provided by the host server, then invokes the auction server application 111 whereupon the message receiver is engaged to process the message.

The UIN for registration is a predetermined number pointing to the registration handler. This way, any messages received by the message receiver that are addressed to the UIN of the registration handler will be forwarded by the message receiver to the registration handler.

Once registered, a user is able to browse products and services available for trade and auction and to place bids for products and services as described in further detail below. Registered users are also able to place their products for trade or auction in the auction database 112 managed by the auction server application 111.

To add a product or service to the auction database 112, a user submits product data to the host server 15, in a similar manner to that described above for submitting registration data. That is, the user accesses the auction server application 111 using their computer 115 and accesses an "add new product" HTML web page. The user then enters product data and submits the product data for entering into the auction database 112 under the control of the auction server application 111. In the embodiment, the following product data is required, some optional, from the user:

Title: A short description of the product that will appear in lists of products on the auction database 112.

User Id: The nickname of the registered user selling the product.

User password: The user's password, this is used to validate the product entry. If the password is incorrect, the product will not be added to the auction database 112.

Auction Type/Method: The user can specify whether the auction is to be conducted as a regular auction or as a Dutch auction, for example.

Item Description: A more detailed description of the item for sale.

Country: The seller's country.

Auction Start Date and Time: The date and time that the auction will commence. Bids for items are not accepted before an auction commences.

Auction Duration: The length of time the auction will last.

Category: A broad identification, selected from a list, of the type of product being sold. For example: antiques, music, or computers.

URL for external resources: An optional universal resource location (URL) that the user can specify for pictures, further information etc.

Computer picture file (optional): A picture of the item to be bid out that can be uploaded directly from the computer 115 to the auction database 112, via the internet 19.

Payment Method: The payment method or methods that the user will accept, such as cash, cheque, or credit card.

Shipping Information: Details concerning the shipment of the product from the seller to the successful buyer such as the cost of shipping, countries that the seller is or is not prepared to ship to, etc.

Minimum Bid: A threshold value that sets a minimum value for the first bid. Bids below the minimum bid value are disregarded by auction server application 111.

Reserve Bid: An optional value specifying a price below which the seller is not prepared to sell the goods.

Bid Increment: The minimum bid increment.

Toggle to use or not use Dynamic Bid Time (optional): This switch tells the auction server to extend or not to extend the auction duration if bids are being received close to the end of the specified auction duration. When the switch is turned on, the auction will be extended until no bids are received for a length of time corresponding to the dynamic bid time.

The product data submitted by the user is checked for completeness by the auction server application 111 and, if the information is complete, the UIN assignor assigns a UIN to the product. The product data and UIN are then stored in the auction database 112.

When the auction commences, bids concerning the product are also stored in the auction database 112.

A user may browse products available for auction on the auction database 112 using his computer 115 via the internet 19. If a user wishes to bid for a product, he simply selects the product and is taken to a bid submission web page. The user's identity is then authenticated using the authentication process described above. If the user's identity is authentic, the user's bid for the product is accepted by the auction server application 111 and stored in the auction database 112. The user's bid is identified for a particular product using the product's UIN. In alternative embodiments, the authentication process may be skipped when placing bids, or only required where the value of the product exceeds a predetermined value.

Users are able to enter two types of bids, a regular bid or an automatic, or proxy bid. A regular bid consists of a single bid for a specific value. An automatic bid specifies a maximum bid by the user. The auction and trade handler then acts as a proxy for the user bidding by the minimum increment for the product up to the user's specified maximum in an attempt to win the bidding for the product by the minimum possible incremental value.

Figure 8:
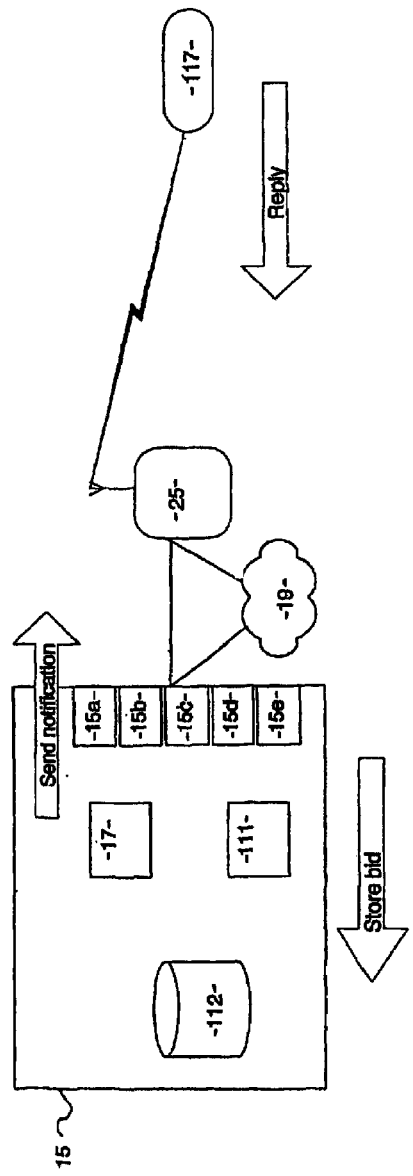
FIG. 8 is a schematic diagram showing generally how a user can receive notifications concerning his bids and submit further bids in the trade and auction service application.

Once the user has registered their first bid for a product, notifications concerning the user's bid and further bids can be sent to and received from the user's GSM mobile phone without the need for the user to have access to his computer 115. FIG. 8 helps illustrate the notification and bid up process.

When a user's bid for a product is beaten, the auction and trade handler instructs the message dispatcher to send an SMS message to the user's GSM mobile phone 117. The auction and message trade handler retrieves the user's mobile phone number from the user information database 17 and forwards this to the message dispatcher to be included as the "recipient" field of the SMS message. the auction and trade handler also forwards the product's UIN to the message dispatcher, which concatenates the numeric access code of the host server 15 with the received product UIN and inserts the resultant number in the "sender" field of the SMS message.

Finally, the auction and trade handler forwards a message text to the message dispatcher for inclusion as the message body of the SMS message. The message text composed by the auction and trade handler includes information concerning the product, such as the product title, the current highest bid, and instructions for placing a further bid. An example message text may read "You have been outbid for 'Antique Bookcase'. The current highest bid is now $1,050. To place another bid, simply reply to this message, and specify the bid type and amount."

The SMS message is sent by the message dispatcher directly to the GSM network's SMSC server system 25, which forwards it to the user's GSM mobile phone 117.

To place another bid for the product, the user simply needs to reply to the SMS message using the reply facility of the GSM mobile phone 117. Advantageously, the reply facility of the GSM mobile phone 117 will automatically take the number in the "sender" field of the original SMS message and insert it in the "recipient" field of the reply SMS message. Accordingly, there is no requirement for the user to recall e-mail addresses or product codes in order to place a subsequent bid. The user simply enters the type of bid and the amount of the bid in the body of the SMS message and sends the SMS message.

To place a regular bid for $1200, the user simply enters "regular 1200" as the text message of the reply SMS message. To place an automatic proxy bid for $1200, the user enters "auto 1200" as the text of the SMS message.

Once the user sends the SMS message, his GSM mobile phone 117 sends it to the GSM network's SMSC server system 25. The SMSC server system 25 identifies the numeric access code of the host server 15 in the "recipient" field of the SMS message and forwards the SMS message directly to the host server 15 via the Internet. The host server 15 decodes the UIN from the message, and on recognising that it concerns the auction server application 111, invokes the message receiver of the auction server application.

Upon receiving the SMS message, the message receiver extracts the product UIN from the "recipient" field of the SMS message, the user's mobile phone number from the "sender" field of the SMS message, and the text message of the SMS message and forwards these to the trade and auction handler.

The trade and auction handler is able to identify the product from the product UIN.

Further, the trade and auction handler can identify the user from their GSM mobile telephone number. In the event that a higher bid has already been received from another user, or the user's bidding instructions were indecipherable, the auction and trade handler sends a reply SMS message to the user's GSM mobile phone 117 notifying them of the error. Otherwise, the trade and auction handler enters the bid from the user in the auction database 112 for that product. Optionally, if the bid is successfully received, the auction and trade handler may send a reply SMS message to the user's GSM mobile telephone 117 notifying them that his bid was successfully received.

In addition to sending notification to the previously highest bidder, the auction trade handler may also be arranged to send the same notifications to some or all of the users that have bid for that product.

Figure 9:
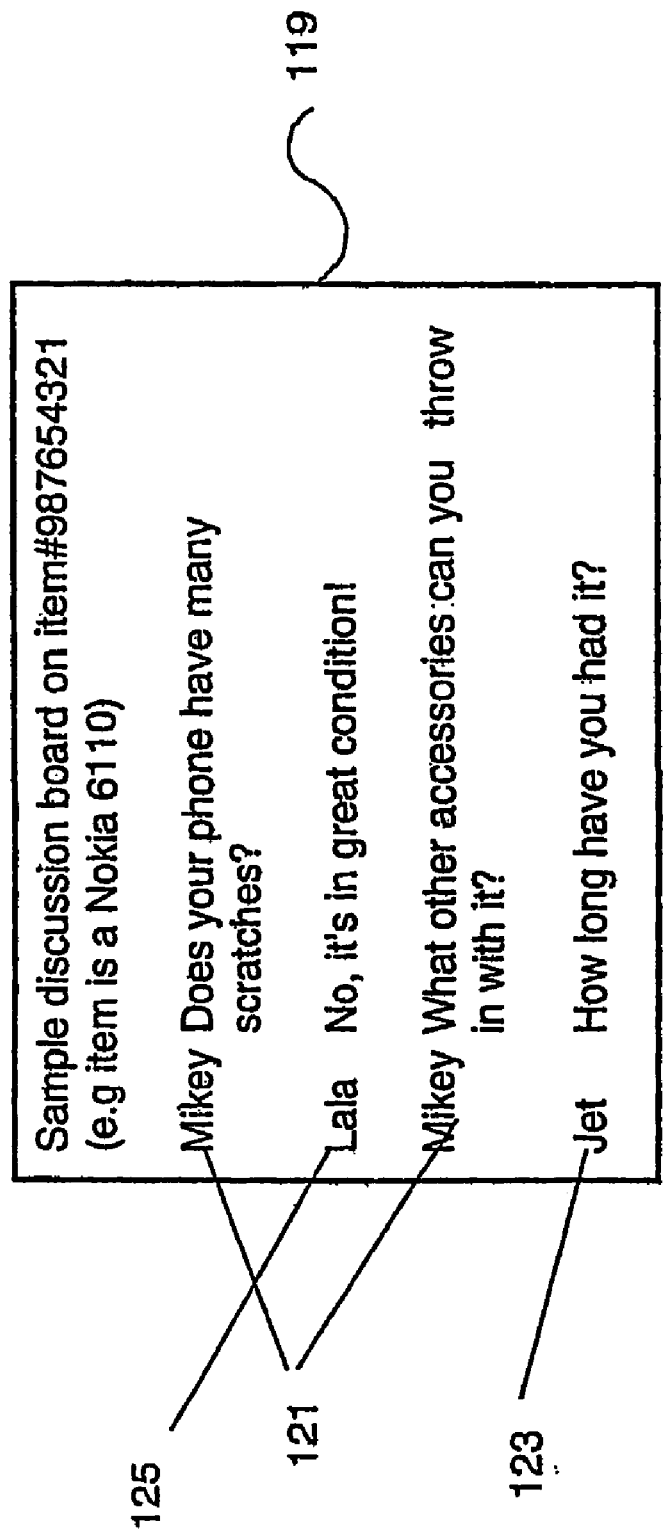
FIG. 9 is a sample discussion board for an auction format service
Figure 11:
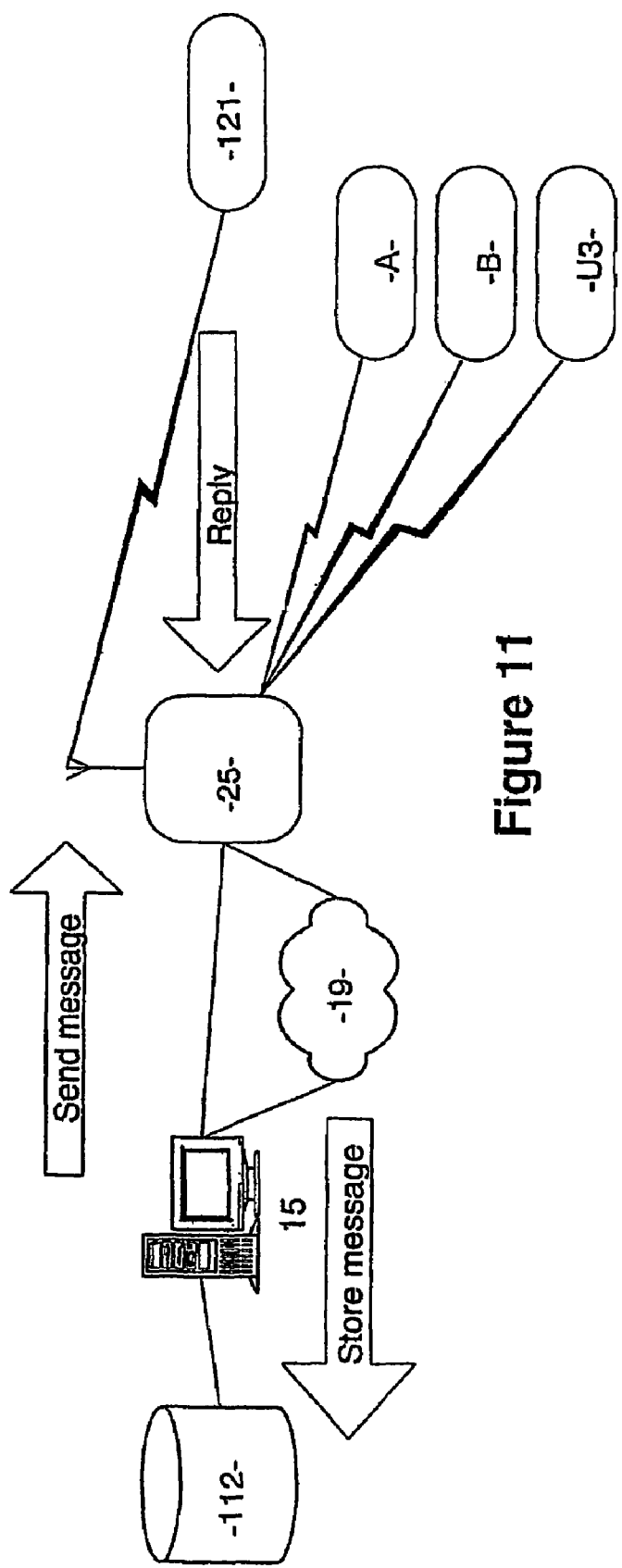
FIG. 11 is a schematic diagram of the messaging system and the interaction of wireless clients with the host server in the auction service format.

Now describing an actual example of an auction format wireless discussion board between wireless clients that have been registered by the auction server application to participate in an auction conducted by the host server 15, reference is made to FIGS. 9 to 11.

As shown in FIG. 9 of the drawings, a sample auction format wireless discussion board 119 is shown in a similar format as to the way it would appear on the website of the trade and auction service described above.

In the illustrated example, the discussion board 119 specifically pertains to item number 987654321. This item number would constitute the UIN for the prescribed action involved with participating in the auction of the item itself and would be included in the "send to" address along with the access code of the host server 15 to the SMSC server system 25 of the GSM carrier for the wireless clients participating in any message sent to or received from the discussion board. It should be noted that the service is not limited to wireless clients of only one GSM carrier, but wireless clients of any carrier that the host server 15 is connected to and has an access code for the routing of SMS messages from the messaging service server of the carrier can participate in any BBS service provided by the host server.

"Mikey" 121 is the pseudonym or buddy name of a first prospective buyer and "Jet" 123 is the pseudonym of a second prospective buyer. "Lala" 125 is the pseudonym of a seller of the item, which in the specific example is a "Nokia 6110" mobile phone.

In this example of the auction format wireless discussion board 119, the prospective buyer "Mikey" sends an SMS message from his mobile phone to a particular NIN, which comprises the concatenation of the access code of the host server and the UIN of the item under discussion. The message contents as indicated contains the text: "Does your phone have many scratches?".

Upon the SMSC server system 25 receiving and sending this SMS to the host server 15, the host server receives and processes the same in the manner previously described, authenticating the sender of the message through the agency of the auction server application after decoding the UIN, whereupon the requisite message will be entered in the auction database and virtually posted to the discussion board 119, enabling the message to be viewed on the auction website of the host server that pertains to the particular item.

In the present embodiment, in order to facilitate participation in the bidding process by bidders who only have GSM devices and not access to a browser based client application, the message is broadcast to the top three unique bidders A, B and C, and the last three unique users U1, U2 and U3, enquiring about the particular item, having regard to their particular client type. As shown in FIG. 11, in the present example where all six of the top three bidders and the last three unique users are wireless clients, SMS messages containing the posted message are sent via the host server 15 to the SMSC server system 25.

In this instance, users who receive a broadcasted message can simply "reply" to the message making it simple to facilitate an exchange of information between interested parties whom may involve one or more wireless clients.

A discussion of the actual process flow is illustrated in FIG. 10 of the drawings. This diagram essentially illustrates the entire process from a wireless client user "Mikey" 121 posting an enquiry on the discussion board 119, to the dissemination of the enquiry to the top three unique bidders A, B and C, as well as the last three unique users enquiring on the same item being bid, namely U1, U2, and U3. The item number is 987654321 and the access code for the host server 15 on the SMSC server system 25 of a common carrier for all the bidders and users is 23301. All of the users have previously registered with the trade and auction service hosted by the host server so the registration process is by-passed.

The process starts at 131 and proceeds with "Mikey" 121 writing another text message enquiry on his mobile phone, the process being indicated by box 133. The message as indicated in box 135 is "Where is the phone made?".

"Mikey" 121 then sends the text message as illustrated box 137 to the NIN 23301987654321 of the host server 15 on the GSM carrier network. This NIN may be stored as a pseudonym in the memory of the mobile phone from a previous registration process, or else obtained from the host server website.

This message is transmitted to the SMSC server system 25 as indicated at 139, which in turn sends it to the host server via the Internet 19 as indicated by the arrow 141. The message is then processed by the host server 15 as indicated by box 143, accessing its user information database and auction database 112 as appropriate, as represented by 145. This processing will include entering the message on the auction database 112 and then actioning a routine which broadcasts the posted message to the top three bidders A, B and C and the last three users U1, U2, and U3 who posted messages on the database, as well as acknowledging the posting to the sender of the message, namely "Mikey" 121.

The broadcasting of the various messages to the SMSC server centre 25 is again undertaken over the Internet 141 as represented by arrow 146. The SMSC server system as represented by box 147 then stores and transmits were possible the relevant message, namely the confirmation SMS message to "Mikey" as represented by box 149, the NIN address of the sender being shown as 23301987654321. In this example, the confirmation reads "Your message has been posted. Thank you." as shown at box 151 ending the transmission at 153.

In the case of the three highest bidders A, B and C, and the three most recent board users U1, U2 and U3, the question posted by "Mikey" is sent by the SMSC server centre 25 to these parties as indicated by box 155. In the present example, the message reads "Mikey: "Where is the phone made?"" as shown in box 157. As indicated, to prevent confusion, the user posting always has his pseudonym or buddy name shown before the colon ":".

The sender NIN or GSM address is similarly shown as 23301987654321. All users presumably would have stored this "GSM—like" address in their mobile phones, allowing them to recognise immediately the product in question. Subsequently, all that the seller, in this case "Lala" 125 would do, is simply reply to the question as he or she would to any SMS message.

Similarly, the six recipients of the last posted message all have the option to reply to the query by simply replying to the received message.

When replying, the process flow is the same as the one that "Mikey" went through in posting the message in the first place. No reply automatically ends the session for the person until he or she receives another query.

In the present embodiment, to access the contents of the BBS without necessarily posting a message, a user simply sends a "?" command in the SMS message portion of a message packet sent to the host server 15 using the NIN comprising the concatenation of the carrier access code and the UIN of the item. Each "?" appearing alone in the message portion of a received SMS message from a wireless client is decoded by the host server 15 as a command for the host server to respond with a list of a prescribed number of messages previously posted, usually the last three or so.

As can be seen from the foregoing description, the invention provides a fast, efficient and convenient method and system for the authentication and transmission of instructions for an auction and trading system whose users have messaging-capable wireless devices such as SMS-enabled GSM devices.

Electronic Bulletin Board

The remaining services referred to, namely personal services, such as a dating or match-making service for couples of various persuasions, and chat room services that are topic or subject matter based, may all be classed as different types of electronic bulletin board services (BBSs) where messages may be posted on a database or bulletin board by one client user and responded to by another client user. These BBSs in the case of involving access by wireless clients, as provided in the present embodiment, generally follow the same format as the auction format wireless discussion board described above in the trade and auction service of the commercial transaction application. Accordingly, they can all simply be accommodated by the same general host server set-up and technically differentiated from one another by the host server 15 by designating different UIN's for different BBS or chat room topics. In this manner the needs of quite a large variety of different interest groups can be met by the one host server provider involving both wireless and wired clients with minimal overhead to the host server provider.

Figure 12:
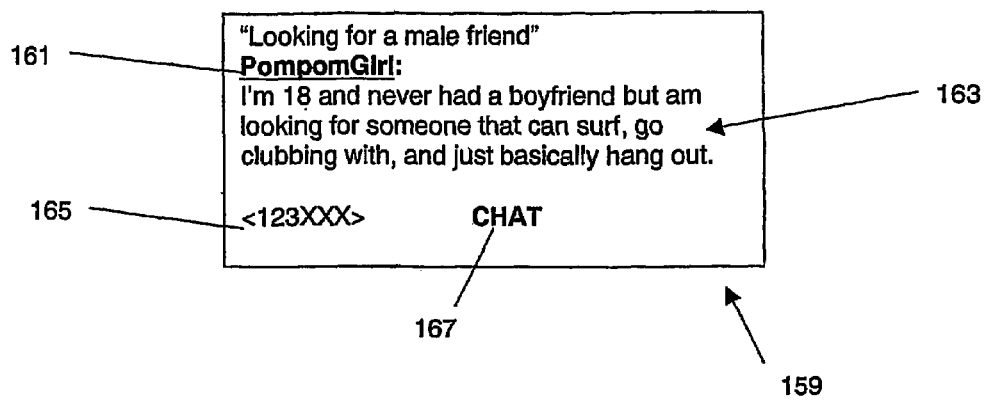
FIG. 12 is a sample discussion board for a personal service associated with "looking for a male friend" involving PC based and wireless clients.

In the case of the personal service, as shown in FIG. 12 of the drawings, a sample discussion board 159 is shown in a similar format as to the way it would appear on a chat room website that would be sampled by a browser based client.

In the illustrated example, the discussion board 159 specifically pertains to the personal service of "looking for a male friend", which would have a dedicated UIN. This may be contrasted against another personal service such as "looking for a female friend" which would have its own discussion board and corresponding UIN to distinguish it from the discussion board 159.

As previously described, the particular UIN for the prescribed action of accessing the particular discussion board would be included in the "send to" address along with the access code of the host server in any SMS message sent from a wireless client wishing to access the particular discussion board.

In the format of the particular discussion board illustrated in FIG. 12, the "looking for a male friend" personal service allows interested parties to get in touch with people who have posted personal advertisements on the discussion board 159. In the present case, the person with the pseudonym "Pompom girl" 161 has posted the personal advertisement 163: "I am 18 and never had a boyfriend but are looking for someone that can surf, go clubbing with, and just basically hangout". The UIN corresponding to the particular posted personal advertisement 165 and a hypertext chat button 167 are associated with any personal advertisement that is posted.

Participation in a chat with the person who posted the personal advertisement involves a combination of browser-based access to the discussion board website and GSM phone use.

The basic requirement is that any person posting a personal advertisement has a wireless client to which any messages sent by interested parties in connection with the advertisement are forwarded by the host server.

On the other hand, the interested party wishing to send a message is required to have a browser-based, PC-based client, or a WAP-enabled wireless client to access the discussion board and optionally a wireless client to engage in a chat with the person posting.

For example, an interested party say "Joe", wanting to chat with the person whom posted the personal advertisement 163, namely "Pompom girl" 161, must go to the discussion board website and either click on the handle "Pompom girl" 161 or the hypertext chat button 167, and then send their message. Clicking the handle 161 or the button 167 causes a personal service application on the host server 15 to be invoked, which allows messages to the discussion board or to the person who posted the advertisement from that particular interested party, to be managed. Messages from Joe can then either be keyed in through the PC accessing the website or Joe's mobile phone, using SMS in the case of the latter. Importantly, the wireless client sending the SMS message to the host server must use the access code and the UIN of the room of the personal service in the "send to" address.

The host server and the personal service application associated with the "looking for a male friend" service will then, in the case of Joe sending the message from his mobile phone, receive the SMS message packet from Joe via the SMSC server system 25 and send the message as an SMS message to the wireless client of "Pompom girl", using "Pompom girl's" CIN in the "send to" address field of the message packet, identifying the host server access code and the UIN of the discussion board in the sender's address field. In its present embodiment, the actual message will consist of the buddy name "Joe" followed by a "colon" symbol and then the original message by Joe. Note: the anonymity of both Joe and Pompom girl is preserved to the extent that their CINs are not disclosed to either party.

"Pompom girl" on eventually receiving the message on her wireless client can respond by simply selecting the "reply to" message service on her GSM phone and key in the response. In this instance, the access code and UIN of the discussion board 159 is automatically put into the "reply to" address field of the reply message packet. The message of "Pompom girl" would then be sent back to "Joe" via the SMS facility and the host server 15, thus preserving the anonymity of both parties again.

A basic rule adopted by the personal service application is that all messages sent by the person hosting the advertisement get sent to the most recent interested party, which would normally be how "Joe" would get the reply. However, in some instances this may not always be the case when there is more than one interested party sending messages to the person posting the advertisement at more or less the same time.

In order to deal with this situation, the personal service application is particularly designed and configured to avoid confusion arising in such instances by interpreting a command in the message portion of a SMS sent in reply to an interested party, identifying the pseudonym of the interested party that sent the message. In the present embodiment, this command is represented by the symbol "@" followed by the pseudonym or buddy-name of the person whom sent the message to which the person who posted the message is replying. For example, if "Pompom girl" was responding to the message received from "Joe", she would include the text "@Joe" (followed by space) preceding the specific text of the message she wished to send to "Joe" in reply to his message.

It should be noted that in the exchange of messages, the personal service application utilises the pseudonyms and buddy-names of the person posting the advertisement and the interested parties in any communication and not their actual GSM numbers, in this way anonymity may be maintained.

Any person logging in to the website of the discussion board, however, must use their registered CIN and their registered unique buddy-name. However, this is not necessary for communications associated with a wireless client, due to the "personal" nature of the telephone.

Figure 13:
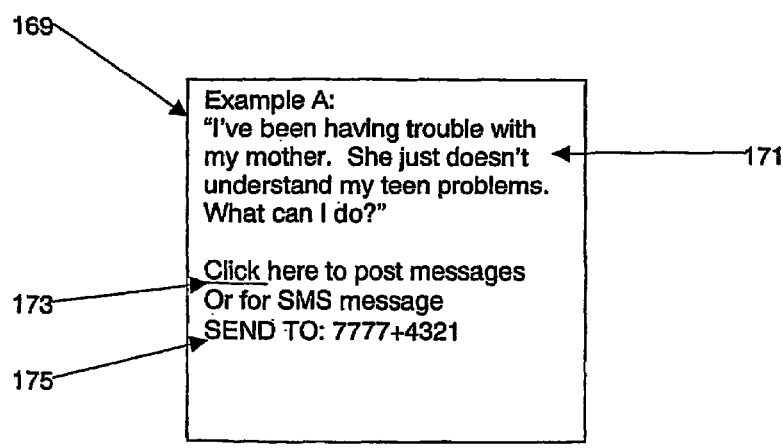
FIG. 13 is a sample discussion board for a chat room associated with a topic relating to "teen troubles"

In the chat room service concerning a particular discussion topic, FIG. 13 of the drawings shows a virtual discussion board 169 concerning a particular topic established by a chat room application provided on the host server 15. The chat room application allows people with the same interest to communicate with one another on a particular topic. The topic of the chat room may be a common interest or a user may create his own chat room so that only certain people, for example selected friends, may enter.

Each chat room topic or user chat room is identified by its own UIN and is managed by an administrator who's task it is to set the room up, invite people to join, determine the security and restriction level of the site, e.g. whether it should require passwords or be open to the public, edit out postings where necessary, and add or delete members to the room as occurs in a restricted room environment etc.

Once the chat room has been established with its UIN, a user who is eligible to enter the chat room can post messages through either their PC or their mobile phone in a similar manner as previously described with other services provided by the host server. Moreover, they can send a message by entering text through the website or by sending an SMS message using the NIN of the host server on the particular GSM carrier concerned, using the concatenation of the access code and the UIN of the particular room being accessed.

In the specific example shown in FIG. 13 of the drawings, the particular room is the "teen troubles room" and has the UIN 4321. The person posting the message has a wireless client that is a member of a GSM carrier where the host server has the access code 7777.

In the illustrated example A, the message 171 that is posted reads "I've been having trouble with my mother. She just doesn't understand my teen problems. What can I do?"

The discussion board 169 also provides two options, one involving a "click" hyper text button 173 for browser based users which reads "Click here to post messages" and the other being details on where to send an SMS message in order to be posted on the discussion board 169. The latter is shown as 175 in the present example and reads: "or for SMS message SEND TO: 77774321". The send to number is the NIN of the host server and discussion board for a particular GSM carrier, the NIN being made up of the carrier access code 7777 and the "teen troubles" room UIN 4321.

The chat room application in the present embodiment is designed and configured so that messages sent out from the chat room are broadcasted to those whom have entered the same chat room, except to the person who just posted the message. Most recent postings get broadcasted to a predetermined number of the most recent unique posting users and the room administrator, if the room administrator was not the one posting the message in the first place. The particular number of users to whom the message is broadcast is set by the room administrator.

Wireless clients receiving messages from the chat room and wishing to post a reply, merely need to reply through the SMS services provided on their phone where the NIN of the host server and chat room would be presumably stored. In this instance, the "reply" to message service would be invoked on a mobile phone, whereupon the NIN 77774321 would be automatically entered into the "send to" address field in the SMS message packet that would ultimately be sent by the wireless client to the host server. This message would be handled by the host server in the usual way, as previously described, whereby the UIN would be decoded and the message directed towards the particular chat room application.

The format of the chat room service in the present embodiment provides for the trend of conversation in the chat room to be queried using the "?" command, similar to the way in which this command is used in the auction room scenario previously described. Sending this command to the NIN in an SMS message from a wireless client will result in triggering a predetermined number of the previous postings to be sent back to the person raising the query, by the host server, for example the last three messages posted may be returned. The query command can be concatenated with further query commands, e.g. "??" to multiply the number of previous postings queried which will be returned to the wireless client. For example in the case of the query "??", two x three, or six messages will be sent, and the query "???" would send three x three, or nine previous messages, and so on. The actual number of messages involved is a parameter that can be adjusted by the room administrator.

It should be appreciated that any type of BBS can be established in this manner, utilising a variety of different client types, including wireless clients using SMS messaging provided under a GSM network.

As an alternative to posting directly using the NIN 77774321, perhaps because the user does not have the NIN information immediately to hand, a user can use menu-driven navigation and—initially—a keyword, to determine the correct NIN to use for the required action.

Figure 14:
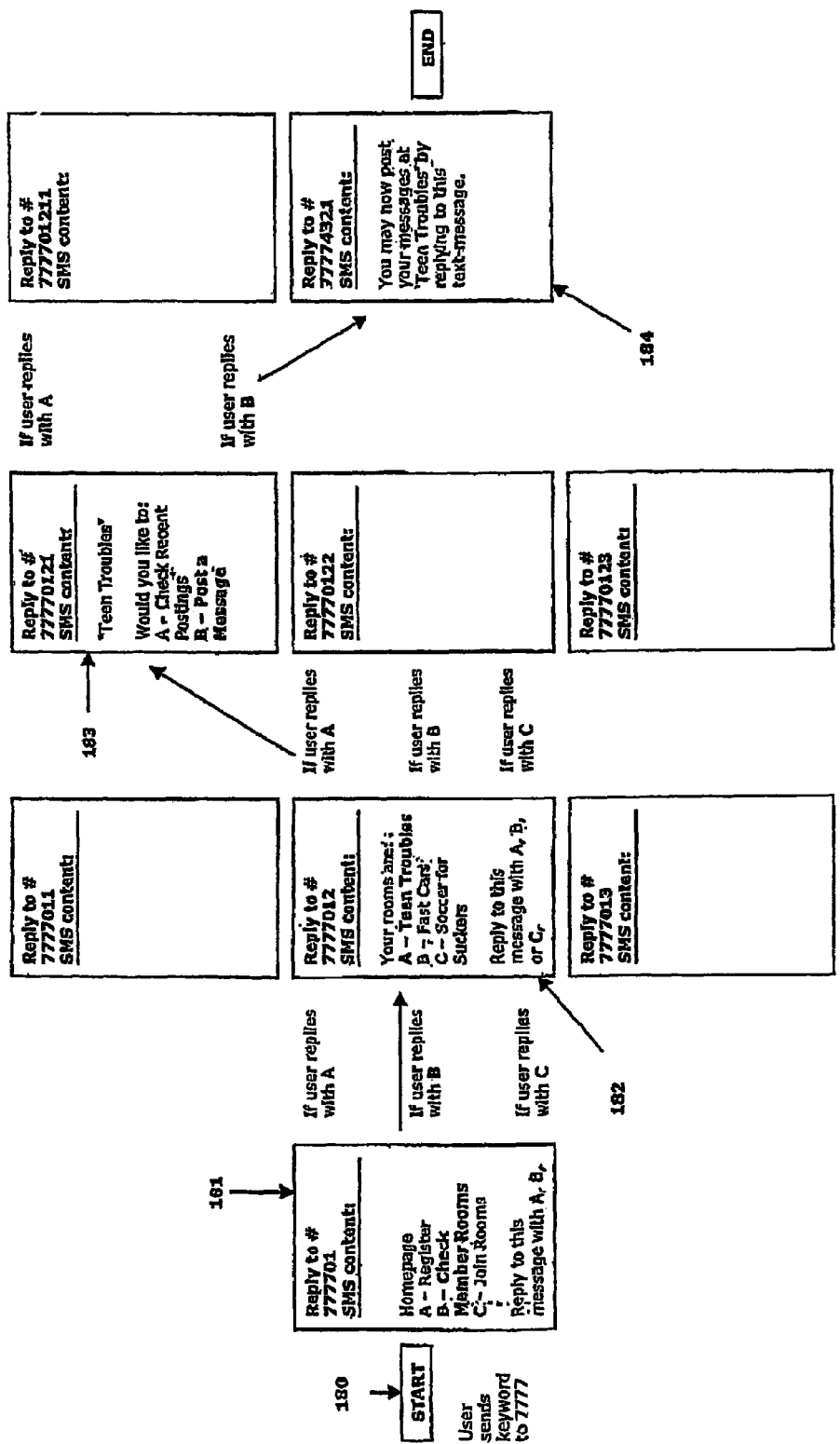
FIG. 14 is a sample menu tree to illustrate the accessing of information by a GSM client from a host server.

FIG. 14 illustrates one example as to how this menu-driven navigation will be embodied. In this example, it is used with an Electronic Bulletin Board service, but could easily be applied to other applications. It is not limited to the example described herein.

Generally, the user navigates through a menu or tree using a string of dynamic access codes that depend upon the user's previous choice in that menu. Once the user gets to the endpoint of the tree, then the full NIN for the required action is relayed to the host server 15 in the same manner as described above.

Using the example illustrated in FIG. 14, to access the menu, the user sends—at step 180—a query comprising the keyword, within an SMS text message. The keyword could be any suitable word that is easily remembered by the user. An example would be the name of the service provider, or, simply "help". This SMS message is sent to the host server 15 via the SMSC server system 15 in the usual way. The SMS text message uses a basic access code, which in the example described herein is "7777". As usual, the user's NIN is inserted in the usual place, and the receiver NIN comprises the basic access code. The keyword is the text.

The host server 15 will receive the SMS query message, and using a menu application, identify the sender of the query message and send an SMS message to the user in response to the query message. This initial SMS message or "homepage" will set out the options available to the user. In FIG. 14, this SMS homepage message—illustrated at step 181—is as follows:

"Homepage A-Register, B-Check member Rooms, C-Join Rooms. Reply to this message with A, B, or C"

The "Reply To" SMS address at the homepage is "777701". This is the original basic access code "7777" plus "01" indicating that this is the first in a series of messages which can be used to determine the correct NIN for the action that is required. The user can then simply reply to the SMS message indicating—in the text portion of the message—what he requires, by inserting either A, B, or C. If the user selects and replies with "B" then he indicates that he wants to post a message at one of his member room. As mentioned above, the first access code—in this case "777701" indicates that this is in response to the homepage message. This access code (and all subsequent access codes) are dynamic in that they depend upon the response to the previous message.

The host server 15 replies to this SMS message with a further SMS message, as indicated at 182 in FIG. 14, which reads as follows:

"Your rooms are: A—Teen Troubles, B—Fast Cars, and C—Soccer for Suckers. Please reply with the room you want to check."

The "Reply To" GSM number is now "7777012". The "Reply To" number depends upon the previous choice of the user. In this case, as the user responded with "B" then the new "Reply To" GSM number is the previous access code— "777701" plus "2" indicating that the user chose "B" in response to the previous SMS message i.e. "7777012". If he had replied with an "A" then the new "Reply To" number would have been "7777011", and so on.

In the present example, the user wishes to check the "Teen Troubles" room, and so replies with "A". The host server 15 recognizes that the user wishes to check "Teen Troubles". The host server 15 sends back the SMS message (step 183), again presenting choices:

"Would you like to: A—Check Recent Postings or B—Post a Message. Please reply with your choice."

The "Reply To" GSM number is now "7770121" (i.e. the previous access code "777012" plus "1"), indicating that the user responded to the previous SMS message with choice "A", and suggesting that his next action will therefore apply to the room "Teen Troubles".

In the present example, the user replies with "B". This tells the host server 15 that the user's next action will be to start posting on the chat room, "Teen Troubles". The access code for this room is "4321", and so the host server 15 sends an SMS message (step 184) to the user:

"You may now post your message at Teen Troubles by replying with the message."

The "Reply To" GSM number is "77774321", as would've been the case in our previous illustrations. The menu system has simplified the process of posting a message by making it unnecessary to remember keywords and even the actual Access Code+Chat Room index combination.

Once the user gets to the endpoints of the tree, the proper action is relayed to the host server in the same manner described in the applications above.

As can be seen from the description, this method of using SMS messaging to access a host server for information on the basis of a pseudo menu-driven enquiry can be used in many applications—not merely in the context of the example described above.

It should be apparent that the present embodiment has several advantages over the prior art. It not only permits access to the host server of a variety of client types, it importantly adopts a format making it have utility to mobile users using wireless client types that are subscribers to a wireless messaging service such as SMS, in a most convenient and efficient manner.

The different types of services that can be established and evolved around the particular format of the present invention are endless and can involve adaptation to provide for far more enhanced and entertaining services involving the communication of messages between parties than is the case with present messaging systems.

It should be appreciated that the scope of the present invention is not limited to the specific mode and the embodiment thereof described herein. Accordingly, changes and improvements to the embodiment that amount to no more than common general knowledge are not considered to depart from the spirit or scope of the invention. In particular, although the preferred embodiment refers to a GSM network having SMS messaging capabilities, other modes of the invention can be provided with different wireless communication networks and messaging systems such as pagers.

The invention claimed is:

1. A messaging system for conveying messages comprising:
   a host server to which a plurality of client devices, including wireless and wired devices, are selectively communicable with by way of a computer network;
   a wireless communication network; and
   at least one GSM wireless client device connected to the wireless communication network and being uniquely identified thereto by way of a network identifying number,
   wherein each GSM wireless client device has a messaging service to convey messages to other wireless client devices connected to the wireless communication network, and also uniquely identified thereto by way of a network identifying number, and the host server using a messaging service server, each message comprising a message packet including an address of an intended recipient and the address of the sender of the message,
   wherein each of the client devices, including wireless and wired devices, communicable with the host server has a client identifying number to uniquely identify the client device to the host server and where the client device is a wireless client device, the client identifying number of such a wireless client device includes at least that wireless client device's network identifying number,
   wherein the host server has a numeric access code to uniquely identify the host server, from other destinations, to the messaging service server,
   wherein a message to be conveyed using the messaging system, as sent by the GSM wireless client device, includes in the address of the intended recipient field at least:

(i) the access code of the host server; and (ii) a dynamic selection number representative of one or more past selections made during the communication session by a person in possession of the GSM wireless client device in response to one or more action options presented by the host server in previous messages, wherein on receipt of the message sent by the GSM wireless client device, the messaging service server forwards the message to the host server corresponding to the access code included in the address of the intended recipient field and the host server identifies one or more prescribed actions it is to undertake with reference to the selection number and any body text of the message.

2. A messaging system as claimed in claim 1, wherein the host server has processing means to:

(i) validate a client identifying number from the address of the sender of a message packet received from the GSM wireless client device;

(ii) process the selection number from the address of the recipient in the message packet having a valid client identifying number associated therewith; and (iii) take one or more prescribed actions as are associated with the selection number, having regard to any accompanying message included within the message packet.

3. A messaging system as claimed in claim 1, wherein the host server has message compilation means to compile a message and send it to a client device using the client identifying number thereof as the address of the intended recipient, or message transferring means to transfer a message received thereby from a GSM wireless client device and sending it to another client device using the client identifying number thereof as the address of the intended recipient, in accordance with the prescribed actions as are associated with the selection number processed thereby.

4. A messaging system as claimed in claim 3, wherein the host server has identifying means to identify a network identifying number from a client identifying number in the address of an intended recipient of a message either compiled by said message compilation means or received by said message transferring means to communicate the message intended for a wireless client device to the messaging service server of that wireless client device via the computer network.

5. A messaging system as claimed in claim 1, wherein said one or more prescribed actions comprises invoking a routine on the host server associated with accessing a topic-specific electronic bulletin board.

6. A messaging system as claimed in claim 5, wherein the message is concerned with either reading, posting or responding to a message on the bulletin board.

7. A messaging system as claimed in claim 1, wherein said one or more prescribed actions comprises invoking a routine on the host server associated with participating in a commercial transaction.

8. A messaging system as claimed in claim 7, wherein the commercial transaction is an auction, and the message is concerned with a bid at the auction in relation to a specific product or item.

9. A messaging system as claimed in claim 1, wherein said one or more prescribed actions comprises invoking a routine on the host server associated with personal services.

10. A messaging system as claimed in claim 1, wherein said one or more prescribed actions comprises invoking a routine on the host server associated with a chat room.

11. A messaging system as claimed in claim 1, wherein said one or more prescribed actions comprises invoking a routine on the host server associated with transferring the message directly to another client device or group of client devices of the host server as specified in the message packet.

12. A messaging system as claimed in claim 1, wherein the host server has processing means to:

(i) validate the client identifying number from the address of the sender of a request message packet received from the GSM wireless client device;

(ii) process the access code from the address of the recipient in the received request message packet having a valid client identifying number associated therewith; and (iii) generate an information message packet in response to a received request message using the received request message packet access code as the sender address in the information message packet.

13. A method of conveying a message comprising the steps of:

receiving a message comprising a message packet including an address of an intended recipient and an address of the sender of the message, from a GSM wireless client device uniquely identified by a network identifying number to a wireless communication network to which it is connected and uniquely identified to a host server, to which a plurality of client devices, including wireless and wired devices, are selectively communicable by way of a computer network and each identified by way of a client identifying number corresponding to the network identifying number;

processing the intended recipient field of the message to determine a unique numeric access code of the host server to which the message is to be conveyed as opposed to other destinations; and routing the message to the host server represented by the unique numeric access code included in the message for the host server to perform one or more prescribed actions as are determined by a dynamic selection number included as part of the intended recipient field, representative of one or more past selections made during the communication session by a person in possession of the GSM wireless client device in response to one or more action options presented by the host server in previous messages and any body text of the message.

14. A host server of a messaging system for conveying messages comprising:

message receiving means for receiving a message from a messaging service server originating from a GSM wireless client device, the message comprising a message packet including an address of an intended recipient and an address of the sender of the message and the address of the intended recipient of the message includes a unique numeric access code of the host server to distinguish the message to be sent to the host server from other messages handled by the messaging service server;

processing means for processing the message to determine a dynamic selection number representative of one or more past selections made during the communication session by a person in possession of the GSM wireless client device in response to one or more action options presented by the host server in previous messages; and action means for initiating at least one prescribed action determined with reference to the selection number and any body text of the message, wherein the host server is selectively communicable with a plurality of client devices, including wireless and wired devices, by way of a computer network, each wireless and wired client device being uniquely identified to the host server by way of a client identifying number and where, in the case of wireless client devices, the client identifying number of the wireless client device corresponds to a network identifying number used by a wireless communication network to which the wireless client device is also connected.

15. A host server as claimed in claim 14, wherein the processing means is further operable to validate the client identifying number from the address of the sender of the message packet originating from the GSM wireless client device and only to initiate the process means and the action means if the client identifying number is validated.

16. A host server as claimed in claim 14, wherein the host server has compilation means to compile a message and send it to a client device using the client identifying number thereof as the address of the intended recipient in accordance with such prescribed actions as are initiated by the action means.

17. A host server as claimed in claim 14, wherein the host server has message transferring means to transfer a message received thereby originating from a GSM wireless client device to another client device using the client identifying number thereof as the address of the intended recipient in accordance with such prescribed actions as are initiated by the action means.

18. A host server as claimed in claim 14, wherein at least one of the prescribed actions initiated by the action means invokes a routine on the host server associated with accessing a topic-specific electronic bulletin board.

19. A host server as claimed in claim 18, wherein the message is concerned with either reading, positing or responding to a message on the bulletin board.

20. A host server as claimed in claim 14, wherein at least one of the prescribed actions initiated by the action means invokes a routine on the host server associated with participating in a commercial transaction.

21. A host server as claimed in claim 20, wherein the commercial transaction is an auction and the message is concerned with a bid at the auction in relation to a specific product or item.

22. A host server as claimed in claim 14, wherein at least one of the prescribed actions initiated by the action means invokes a routine on the host server associated with personal services.

23. A host server as claimed in claim 14, wherein at least one of the prescribed actions initiated by the action means invokes a routine on the host server associated with a chat room.

24. A host server as claimed in claim 14, wherein at least one of the prescribed actions initiated by the action means invokes a routine on the host server associated with transferring the message directly to another client device or group of client devices as specified in the message packet.

25. A host server as claimed in claim 24, wherein the group of client devices are those stored in a database connected to the host server as buddies of the GSM wireless client device who originated the message.

26. A computer readable medium having at least one computer program recorded thereon that, when executed by a computer, operates to:

receive a message comprising a message packet including an address of an intended recipient and an address of the sender of the message, from a GSM wireless client device uniquely identified by a network identifying number to a wireless communication network to which it is connected and uniquely identified to a host server, to which a plurality of client devices, including wireless and wired devices, are selectively communicable by way of a computer network and each identified by way of a client identifying number corresponding to the network identifying number;

process the intended recipient field of the message to determine a unique numeric access code of the host server to which the message is to be conveyed as opposed to other destinations; and route the message to the host server represented by the unique numeric access code included in the message for the host server to perform one or more prescribed actions as are determined by a dynamic selection number included as part of the intended recipient field, representative of one or more past selections made during the communication session by a person in possession of the GSM wireless client device in response to one or more action options presented by the host server in previous messages and any body text of the message.

27. A computer readable medium having at least one computer program recorded thereon that, when executed by a computer, operates in a messaging system environment wherein a host server is selectively communicable with a plurality of client devices, including wireless and wired devices, by way of a computer network, each wireless and wired client device being uniquely identified to the host server by way of a client identifying number and where, in the case of wireless client devices, the client identifying number of the wireless client device corresponds to a network identifying number used by a wireless communication network to which the wireless client device is also connected, the computer program, on execution, operable to:

receive a message from a messaging service server originating from a GSM wireless client device, the message comprising a message packet including an address of an intended recipient and an address of the sender of the message and the address of the intended recipient of the message includes a unique numeric access code of the host server to distinguish the message to be sent to the host server from other messages handled by the messaging service server;

process the message to determine a dynamic selection number representative of one or more past selections made during the communication session by a person in possession of the GSM wireless client device in response to one or more action options presented by the host server in previous messages; and initiate at least one prescribed action determined with reference to the selection number and any body text of the message.

* * * * *